US006359582B1

(12) United States Patent
MacAleese et al.

(10) Patent No.: US 6,359,582 B1
(45) Date of Patent: *Mar. 19, 2002

(54) CONCEALED WEAPONS DETECTION SYSTEM

(75) Inventors: Gregory B. MacAleese, Corrales; Jerry Hausner, Albuquerque; Paul J. Menicucci, Albuquerque; Robert H. Gorman, Albuquerque, all of NM (US)

(73) Assignee: The MacAleese Companies, Inc., Albuquerque, NM (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/932,811

(22) Filed: Sep. 16, 1997

Related U.S. Application Data

(60) Provisional application No. 60/026,444, filed on Sep. 18, 1996.

(51) Int. Cl.[7] .......................... G01S 7/292; G01S 13/04
(52) U.S. Cl. .......................... 342/22; 342/90; 342/27; 342/192; 342/197
(58) Field of Search .......................... 342/22, 28, 199, 342/21, 27, 52, 53, 54, 66, 90, 173, 176, 180, 181, 191, 192, 193, 194, 195, 197

(56) References Cited

U.S. PATENT DOCUMENTS

| 3,500,395 | A | 3/1970 | Foster et al. ................ 343/5 |
| 3,599,211 | A | 8/1971 | Mardon .................... 343/100 |
| 3,669,038 | A | 6/1972 | Watson .................... 109/12 |
| 3,707,672 | A | 12/1972 | Miller et al. ............. 324/239 |
| 3,713,156 | A | 1/1973 | Pothier .................... 343/17 |

(List continued on next page.)

FOREIGN PATENT DOCUMENTS

| JP | 09304517 | 11/1997 |
| WO | WO 96/19737 | 6/1996 |
| WO | WO 97/01771 | 1/1997 |

OTHER PUBLICATIONS

Reber, E.E., et al., "Evaluation of Active and Passive Near–Millimeter–Wave Radiometric Imaging Techniques for Detection of Concealed Object," *Aerospace Report No. ATR–80(7843)–2*, Sandia Laboratories, Albuquerque, New Mexico 87115, Contract No. 13–90245 (Mar. 20, 1981).

Abbott, G.F., "Personal Surveillance System," *IBM Technical Disclosure Bulletin*, vol. 12, No. 7 (Dec. 1969) pp 1119–1120.

(List continued on next page.)

*Primary Examiner*—John B. Sotomayor
(74) *Attorney, Agent, or Firm*—Deborah A. Peacock

(57) ABSTRACT

A weapons detector (12) and method utilizing radar. The system comprises a transmitter (27) for producing an output (14) of frequencies of a set of self-resonant frequencies of weaponry; an antenna (28) directing the transmitter output toward locations potentially having weaponry and collecting backscattered signals (15); a receiver (29) receiving the backscattered signals (15) and operating over a range of the self-resonant frequencies; and a signal processor (30) for detecting the presence of a plurality of the self-resonant frequencies in the backscattered signals (15). Accuracies of greater than 98% can be obtained at distances, preferably between 4–15 yards. The weapons detector (12) is capable of detecting metal and non-metal weapons (16) on a human body (13) in purses, briefcases and under clothing; and discerning weapons (16) from objects such as belt buckles, coins, keys, calculators, cellular phones.

50 Claims, 23 Drawing Sheets

U.S. PATENT DOCUMENTS

| | | | |
|---|---|---|---|
| 3,911,435 A | 10/1975 | Mardon et al. | 343/100 ME |
| 3,924,546 A | 12/1975 | Pretini | 109/3 |
| 4,064,458 A | 12/1977 | De Loach, Jr. | 325/54 |
| 4,122,783 A | 10/1978 | Pretini | 109/3 |
| 4,341,165 A | 7/1982 | Calandritti et al. | 109/8 |
| 4,461,221 A | 7/1984 | Schandle et al. | 109/6 |
| 4,481,887 A | 11/1984 | Urbano | 109/3 |
| 4,586,441 A | 5/1986 | Zekich | 109/8 |
| 4,656,954 A | 4/1987 | Tonali | 109/6 |
| 4,675,677 A | 6/1987 | von Maydell et al. | 342/25 |
| 4,706,031 A | 11/1987 | Michiguchi et al. | 324/337 |
| 4,905,008 A | 2/1990 | Kawano et al. | 342/22 |
| 5,039,981 A | 8/1991 | Rodriquez | 340/551 |
| 5,081,456 A | 1/1992 | Michiguchi et al. | 342/22 |
| 5,195,448 A | 3/1993 | Sims | 109/6 |
| 5,222,155 A | 6/1993 | Delanoy et al. | 382/30 |
| 5,227,800 A | 7/1993 | Huguenin et al. | 342/179 |
| 5,311,166 A | 5/1994 | Frye | 340/541 |
| 5,334,981 A | 8/1994 | Smith et al. | 342/27 |
| 5,337,053 A | 8/1994 | Dwyer | 342/90 |
| 5,345,240 A | 9/1994 | Frazier | 342/24 |
| 5,365,237 A | 11/1994 | Johnson et al. | 342/179 |
| 5,381,153 A | 1/1995 | Saito et al. | 342/70 |
| 5,408,414 A | 4/1995 | Nomoto et al. | 364/449 |
| 5,446,461 A | 8/1995 | Frazier | 342/22 |
| 5,455,590 A | 10/1995 | Collins et al. | 342/179 |
| 5,457,394 A | 10/1995 | McEwan | 324/642 |
| 5,512,834 A | 4/1996 | McEwan | 324/642 |
| 5,517,429 A | 5/1996 | Harrison | 364/516 |
| 5,519,400 A | 5/1996 | McEwan | 342/28 |
| 5,552,705 A | 9/1996 | Keller | 324/239 |
| 5,552,766 A | 9/1996 | Lee et al. | 340/541 |
| 5,557,283 A | 9/1996 | Sheen et al. | 342/179 |
| 5,576,972 A | 11/1996 | Harrison | 364/516 |
| 5,598,152 A | 1/1997 | Scarzello | 340/850 |
| 5,644,314 A | 7/1997 | Ahmad et al. | 342/22 |
| 5,673,050 A | 9/1997 | Moussally et al. | 342/22 |
| 5,692,446 A | 12/1997 | Becker et al. | 109/3 |
| 5,694,498 A | 12/1997 | Manasson et al. | 385/15 |
| 5,694,867 A | 12/1997 | Diaz-Lopez | 109/6 |
| 5,706,402 A | 1/1998 | Bell | 395/23 |
| 5,774,357 A | 6/1998 | Hoffberg et al. | 364/188 |

OTHER PUBLICATIONS

Abbott, G.F. "Personal Surveillance System" IBM Tech. Discl. Bulletin, vol. 12, No. 7, Dec., 1969, pp. 1119–1120.

Bhanu, B. "Guest Editorial: Introduction to the Special Issue on Automatic Target Detection and Recognition" IEEE Transactions on Image Processing, vol. 6, No. 1, Jan., 1997. pp. 1–6.

McMakin, D.L. et al. "Remote Concealed Weapons and Explosive Detection on People Using Millimeter–wave Holography" 1996 IEEE. pp. 19–25.

McMillan, R.W. et al. "Concealed Weapon Detection Using Microwave and Millimeter Wave Sensors" 1998 IEEE. pp. 1–4.

Murray, N.C. et al. "Exploitation of X–Ray Technology for the Detection of Contraband—Aviation Security Applications" European Conf. on Sec. and Detection Apr. 28–30, 1997, Conf. Publ. No. 437. pp. 13–18.

Reber, E.E. et al. "Final Report: Evaluation of Active and Passive Near–Millimeter–Wave Radiometric Imaging Techniques for Detection of Concealed Objects" Aerospace Report No. ATR–80(7843)–2, Mar. 20, 1981. pp. 1–29.

Varshney, P.K. et al. "On the Modeling of the Sensor Fusion Process for Concealed Weapons Detection" 1998 IEEE. p. 14.

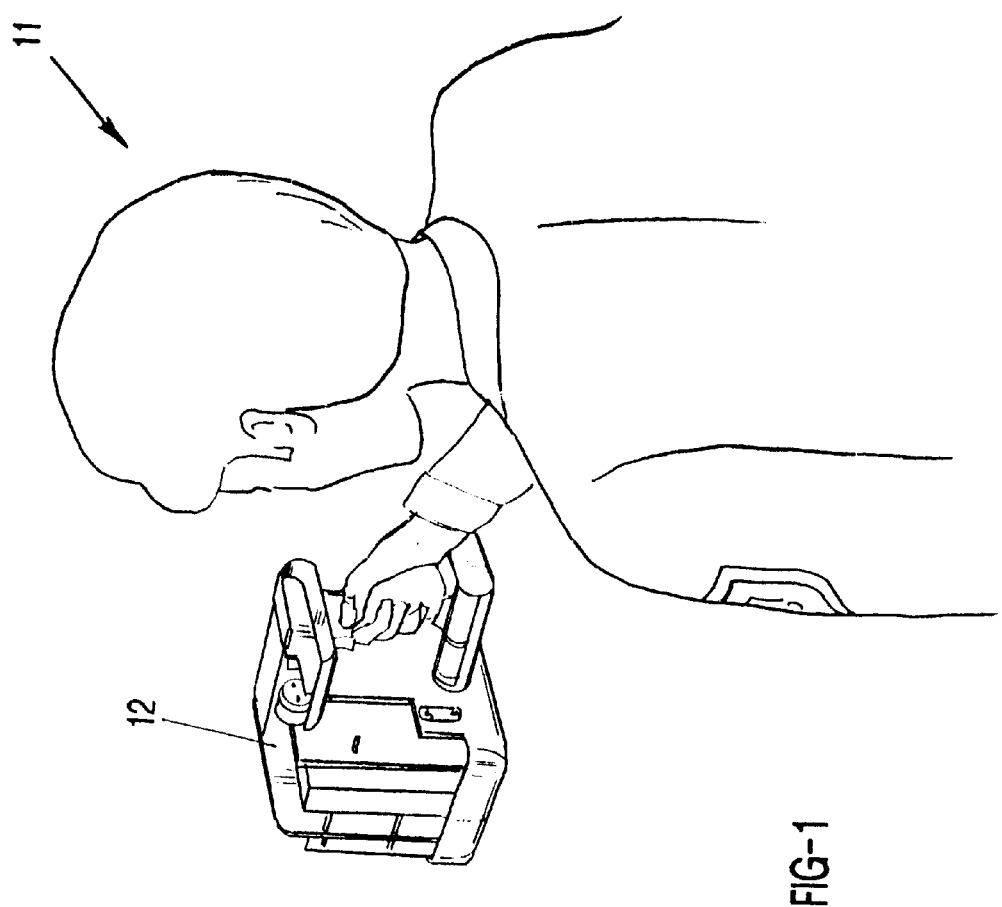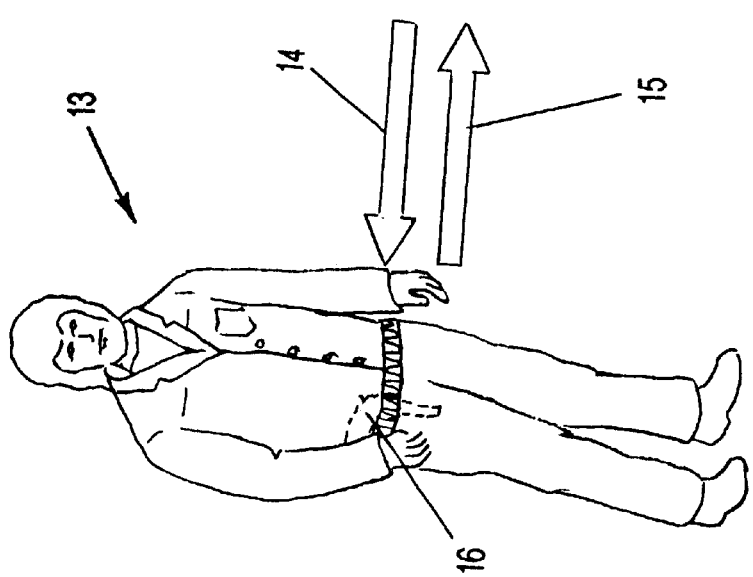
FIG-1

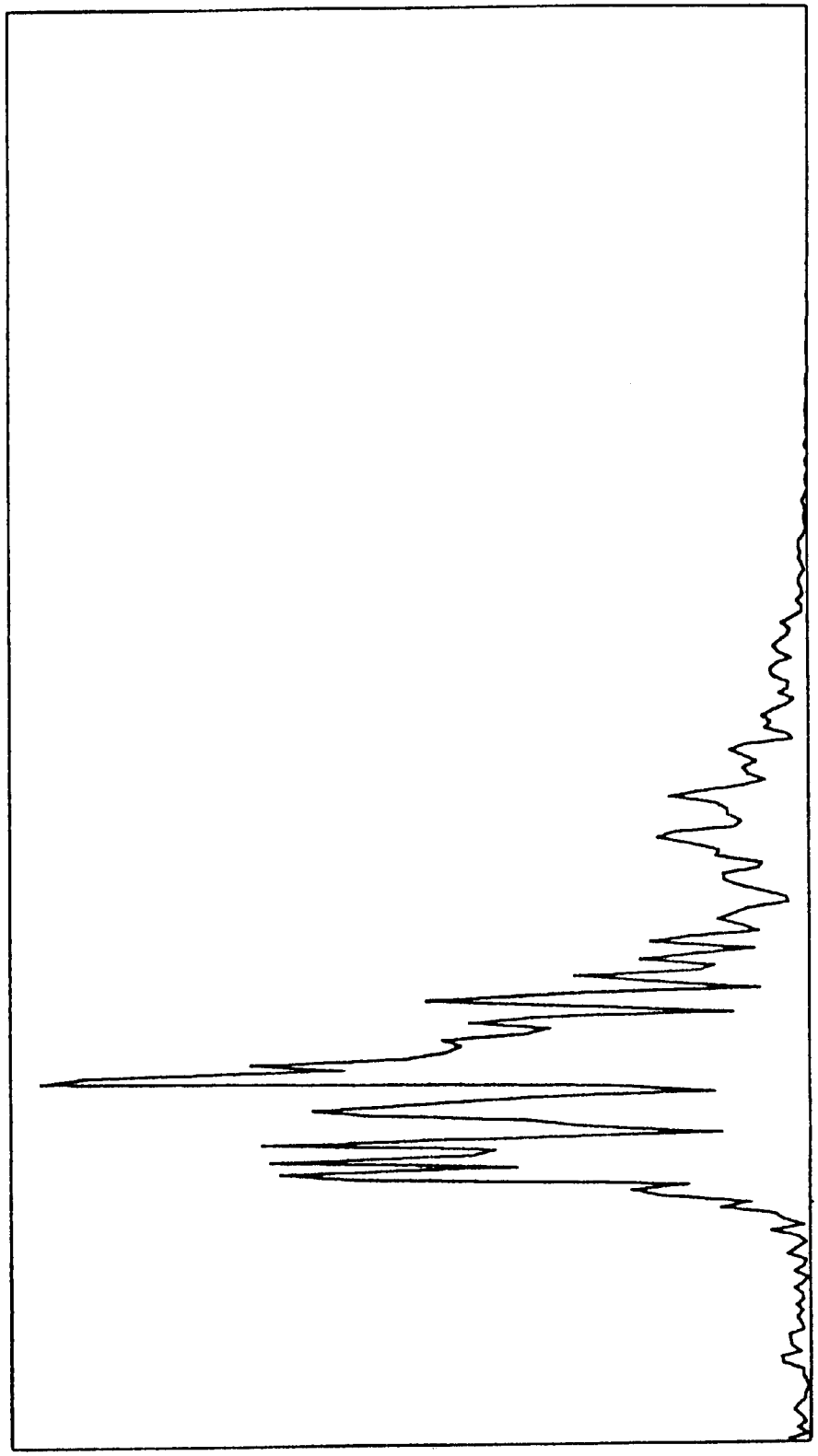

| TEST | OUT 1 | TAR 1 | |
|---|---|---|---|
| 1 | 0.897677 | 1 | F9MB14M9MM2 pg. 21 MAN FACING FRONT 9mm UNDER ARM |
| 2 | 0.960756 | 1 | L9MU14M9MM3 pg. 21 MAN LEFT SIDE 9mm IN BELT SIDE ARMS UP |
| 3 | 0.940307 | 1 | BPM014M9MM3 pg. 21 MAN BACK 9mm IN BELT BACK |
| 4 | 0.973769 | 1 | F80B15M3801 pg. 21 MAN FACING FRONT .380 IN BELT FRONT |
| 5 | 0.984504 | 1 | S80U15M3803 pg. 21 MAN LEFT SIDE .380 IN BELT SIDE ARMS UP |
| 6 | 0.996633 | 1 | B80B15M3803 pg. 21 MAN BACK .380 IN BELT BACK |
| 7 | 0.961682 | 1 | S38D15M38_3 pg. 21 MAN LEFT SIDE .38 IN BELT SIDE ARMS DOWN |
| 8 | 0.972664 | 1 | B38B15M38_3 pg. 21 MAN BACK .38 IN BELT BACK |
| 9 | 0.998297 | 1 | F9MB16M9MM1 pg. 21 CLUTTERED MAN FACING FRONT 9mm IN BELT FRONT |
| 10 | 0.995074 | 1 | S9MD16M9MM3 pg. 21 CLUTTERED MAN LEFT SIDE 9mm IN BELT SIDE ARMS DOWN |
| 11 | 0.972158 | 1 | B9MB16M9MM3 pg. 21 CLUTTERED MAN BACK 9mm IN BELT BACK |
| 12 | 0.962118 | 1 | S57U16M3573 pg. 21 CLUTTERED MAN LEFT SIDE .357 IN BELT SIDE ARMS UP |
| 13 | 0.917679 | 1 | B57B16M3573 pg. 21 CLUTTERED MAN BACK .357 IN BELT BACK |
| 14 | 0.942214 | 1 | F38B16M38_1 pg. 21 CLUTTERED MAN FACING FRONT .38 IN BELT SIDE |
| 15 | 0.95377 | 1 | F38U16M38_2 pg. 21 CLUTTERED MAN FACING FRONT .38 UNDER ARM |
| 16 | 0.999085 | 1 | S38U16M38_3 pg. 21 CLUTTERED MAN LEFT SIDE .38 IN BELT SIDE ARMS UP |
| 17 | 0.983032 | 1 | B38B16M38_3 pg. 21 CLUTTERED MAN BACK .38 IN BELT BACK |
| 18 | 0.959351 | 1 | FSPB16MSP_1 pg. 21 CLUTTERED MAN FACING FRONT SP IN BELT FRONT |
| 19 | 0.949642 | 1 | BSPB16MSP_3 pg. 21 CLUTTERED MAN BACK SP IN BELT BACK |

FIG-17

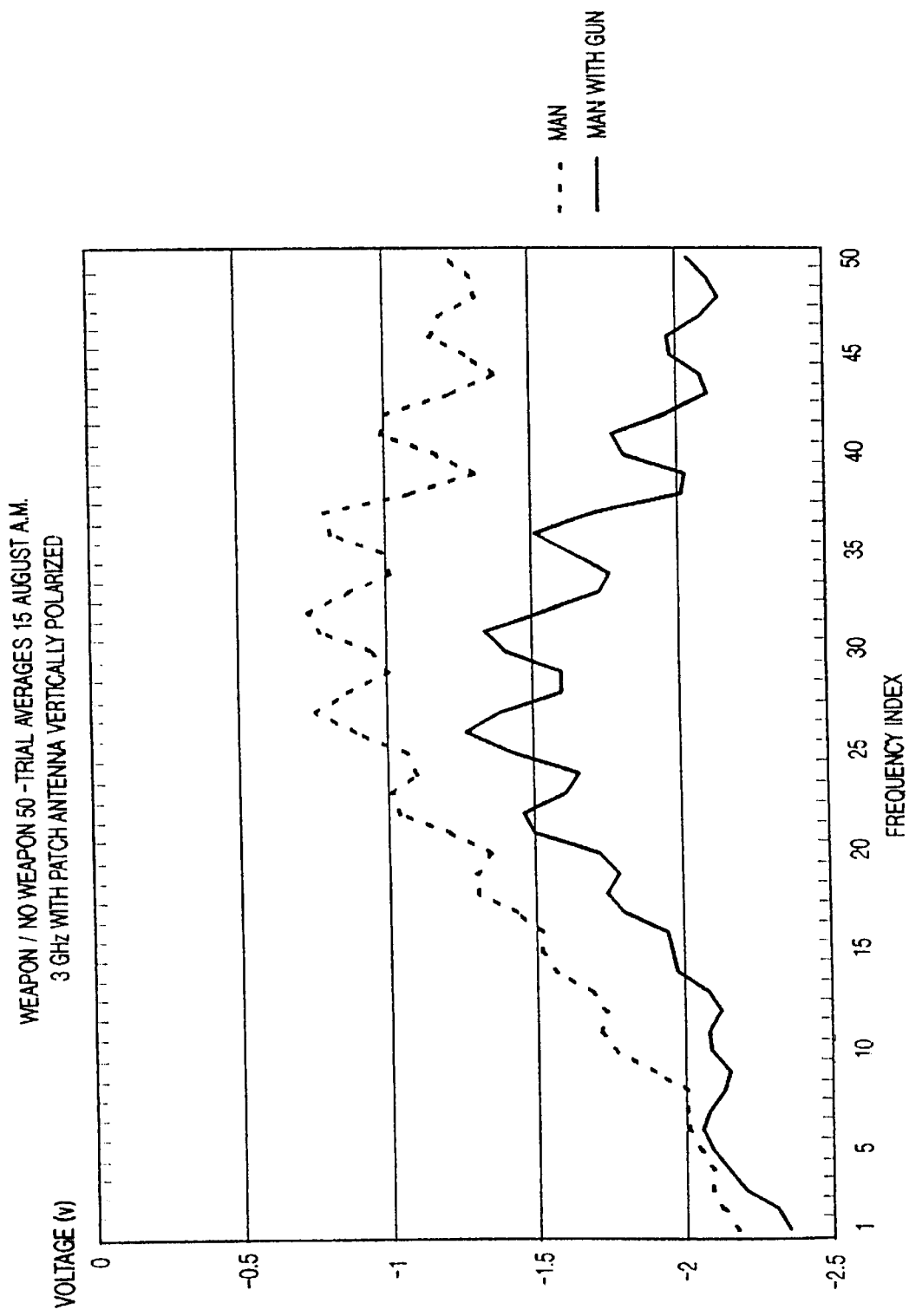

CONCEALED WEAPONS DETECTION SYSTEM

CROSS-REFERENCE TO RELATED APPLICATIONS

This application claims the benefit of the filing of U.S. Provisional Patent Application Serial No. 60/026,444, entitled Concealed Weapons Detection System, filed on Sep. 18, 1996, and the specification thereof is incorporated herein by reference.

BACKGROUND OF THE INVENTION

1. Field of the Invention (Technical Field)

The present invention relates to apparatuses and methods for remotely detecting concealed weapons.

2. Background Art

There are no known weapons detection systems on the market today that can detect a concealed weapon from a distance of more than three feet. Virtually every device in operation is an electromagnetic device that requires the use of a portal. An eddy current flows through the portal and when metallic objects create a change in the magnetic flux, it activates a warning signal. This type of system cannot discriminate between concealed weapons and other metallic objects such as belt buckles, jewelry, coins, watches, or calculators.

Millitech Corporation of South Deerfield, Mass., may be developing a passive millimeter system. The system apparently would require the use of a portal, a floor plate, a video camera and a cathode ray tube to view the area being searched. Millitech has claimed it was developing a 300 mm aperture camera for fixed entrance-way surveillance to demonstrate their technology. The company claims its passive millimeter wave imagers will not require the subject to be exposed to any man-made electromagnetic fields or other radiation from an imaging system.

Likewise, Demma et al. utilizes millimeter-wave efforts but has not been able to detect non-metallic objects successfully. They also have limited ranging, being effective only to 2 meters. Infrared technologies, covered extensive in Demma et al., have great difficulty penetrating layers of clothing. In addition, in warmer climates, a gun carried on the body will take on the same temperatures as the body, making infrared virtually useless.

The Raytheon Company of Portsmouth, R.I., bases its weapons detection system on low frequency electromagnetic radiation. Their concept is based on illuminating the subject with a low intensity electromagnetic pulse known as a Heaviside pulse and measuring the time decay of the reradiated energy from metal objects carried by the person. The intensity and the time decay of the secondary radiation can be characterized and the signatures identified as a gun or non-threatening metal objects.

Idaho National Engineering Laboratory uses technology based on passive sampling of the earth's magnetic field. Local aberrations in the magnetic field are produced by ferromagnetic objects such as guns and knives. In the gun detection system being developed by Idaho National Engineering Laboratory, the magnetic aberrations or anomalies were to be sensed and measured by magnetic gradiometers. They were planning to construct a scanner using a multiple magnetometer design that could be a standalone unit, much like an airport scanner system. The scanner would be triggered electronically by a threshold detector. Data would be collected simultaneously from all sensors in the system providing a top to bottom magnetic profile of the targeted person. Reasonable suspicion about the presence of a concealed weapon would be dictated by the location and magnitude of magnetic anomalies.

Other attempts to provide a useful weapons detection system (or solve some marginally related detection problem) include U.S. Pat. No. 5,552,705, entitled "Non-Obstrusive Weapon Detection System and Method for Discriminating Between a Concealed Weapon and Other metal Objects," to Keller; U.S. Pat. No. 5,519,400, entitled "Phase Coded, Micro-Power Impulse Radar Motion Sensor," to McEwan; U.S. Pat. No. 5,512,834, entitled "Homodyne IMpulse Radar Hidden Object Locator," to McEwan; U.S. Pat. No. 5,457,394, entitled "Impulse Radar Studfinder," to McEwan; U.S. Pat. No. 5,381,153, entitled "Portable FM-CW Radar Device with Frequency Conversion by First and Second Frequencies," to Saito et al.; U.S. Pat. No. 5,365,237, entitled "Microwave Camera," to Johnson et al.; U.S. Pat. No. 5,345,240, entitled "Handheld Obstacle Penetrating Motion Detecting Radar," to Frazier; U.S. Pat. No. 5,337,053, entitled "Method and Apparatus for Classifying Targets," to Dwyer; U.S. Pat. No. 5,334,981, entitled "Airborne Metal Detecting Radar," to Smith et al.; U.S. Pat. No. 4,905,008, entitled "Radar Type Underground Searching Apparatus," to Kawano et al.; U.S. Pat. No. 3,707, 672, entitled "Weapon Detector Utilizing the Pulsed Field Technique to Detect Weapons on the Basis of Weapons Thickness," to Miller et al.; and Demma et al., entitled "Remote Concealed Weapon Detection by Electromagnetic Imaging Techniques."

Miller and Keller employ magnetic field sensors and so will not detect guns made of non-magnetic materials such as aluminum, brass, and copper. McEwan '400 employs monodyne impulse radar and cannot discriminate between object types. McEwan '834 and '394 employ impulse radars to locate large objects behind dielectric media and do not attempt to identify objects detected. Saito et al. employs Doppler radar to determine existence and motion of an object, but not the nature of the object. Johnson et al. is essentially a microwave ultrasound imager and does not measure or examine backscatter. Frazier is a conventional moving target indicator (MTI) radar. Dwyer does analyze radar backscattering but does so with respect to unobstructed objects, not concealed ones. Smith et al. uses radar cross polarization scattering for camouflaged metal detection, but does not rely on spectral content. Kawano et al. is a simple radar system for seeking objects or pockets below ground.

The present invention solves the deficiencies of the prior art. It illuminates a subject with a low intensity short pulse radar. Objects made of metal or high dielectric constant non-conductive material are nearly all backscattered. If a handgun is present, a unique spectral signature is received. Signatures can be prestored or learned by a computer employing artificial intelligence techniques.

The invention has an operating distance of at least between four yards to 20 yards. The invention, in its portable, hand-held form, is useful by law enforcement agencies, correctional facilities, the military and private security companies in the United States and throughout the world. The door-mounted embodiment is useful by federal, state and local governments, as well as financial institutions, convenience stores and other retail businesses, airports, schools and owners of private office and apartment buildings. Each of these entities has a critical need for a low-cost, highly dependable weapons detection system. The Bureau of Alcohol, Tobacco and Firearms estimates there are between 60 million to 200 million firearms in the United States today.

More than 65,000 people were killed by firearms in the United States between 1988 and 1992. In 1993, homicides were the second leading cause of job-related fatalities in the United States, following only highway accidents. In 1993, the Federal Bureau of Investigation reported there were 11,876 bank robberies in the United States, resulting in a loss of $39.3 million. There were almost 35,000 armed robberies to convenience stores in the United States, accounting for a $15.7 million loss. In addition, the National Education Association reports an estimated 100,000 students carry a gun to school. Gunshots now cause one in every four deaths among American teenagers. Other countries are facing similar problems. The present invention seeks to lower these appalling statistics.

SUMMARY OF THE INVENTION
(DISCLOSURE OF THE INVENTION)

The present invention is directed to a weapons detection system. The preferred weapons detector comprises: a transmitter for producing an output of frequencies of a set of self-resonant frequencies of weaponry; an antenna directing the transmitter output toward locations potentially having weaponry and collecting backscattered signals; a receiver receiving the backscattered signals and operating over a range of the self-resonant frequencies; and a signal processor for detecting presence of a plurality of the self-resonant frequencies in the backscattered signals.

A range finder is preferably used for normalizing the backscattered signals. The transmitter preferably produces an output of frequencies between approximately 1 GHz and approximately 10 Ghz. The time resolution of the receiver is preferably less than approximately 10 nanoseconds. The minimum signal detection capability of the receiver is preferably less than approximately 1 millivolt.

The weapons detector makes a prediction about presence of weaponry on a human body. The accuracy is better than or equal to approximately 75%, preferably better than or equal to approximately 95%, and most preferably better than or equal to approximately 98%. Accuracies of 99.75% have been obtained.

The weapons detector may be portable, hand-held, mounted on a wall or in a doorway. Weaponry is detected preferably between 3–20 yards and most preferably between 4–15 yards. Upon detection, the doorway could be activated (e.g., to lock) or a camera could take a picture of the suspect.

A neural network is preferably utilized in the signal processor to aid in detection. The neural network is trained to recognize backscattered signals from weaponry prior to field use.

Preferably, the weapons detector provides a result within approximately one second of transmitter output. The weapons detector can indicate presence and absence of weaponry. Possible indicators are: audible signals, silent signals, tactile signals, visual signals, mechanical signals, and displayed messages. The weapons detector is useful for detecting weaponry such as handguns, rifles, shotguns, and pipe bombs. The weapons detector is also useful for discerning weaponry from objects such as belt buckles, bracelets, wristwatches, tape recorders, soft drink cans, coins, calculators, lipstick holders, calculators, campaign buttons, cellular telephones, key rings, keys and the like. Weaponry can be detected in or under clothing or accessories such as purses, belts, holsters, pants, briefcases, coats and shirts.

Principal objects of the present invention are to detect concealed weapons with a high accuracy (i.e., 98%), a one second response time or better, portability, an effective operating range (e.g., four to 15 yards, equivalent to the distance of a typical traffic stop, or more (up to fifty yards)), limited operational complexity, and high durability.

Another object of the invention is to provide a door model able to cover an area approximately three yards by five yards or better around an entrance.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 1 depicts the operation of one embodiment of the hand-held embodiment of the invention in use by a law enforcement officer to survey a suspect standing outside of a stopped vehicle;

FIGS. 6A and 6B are graphical comparisons of the Fourier transform of the time-domain signatures of a human body with and without a firearm in FIGS. 4A and 4B;

FIG. 17 is a chart of the raw data of the test of FIG. 16;

FIG. 21 is a plot of trial averages employing a 3 GHz patch antenna vertically polarized.

Figure 2A:
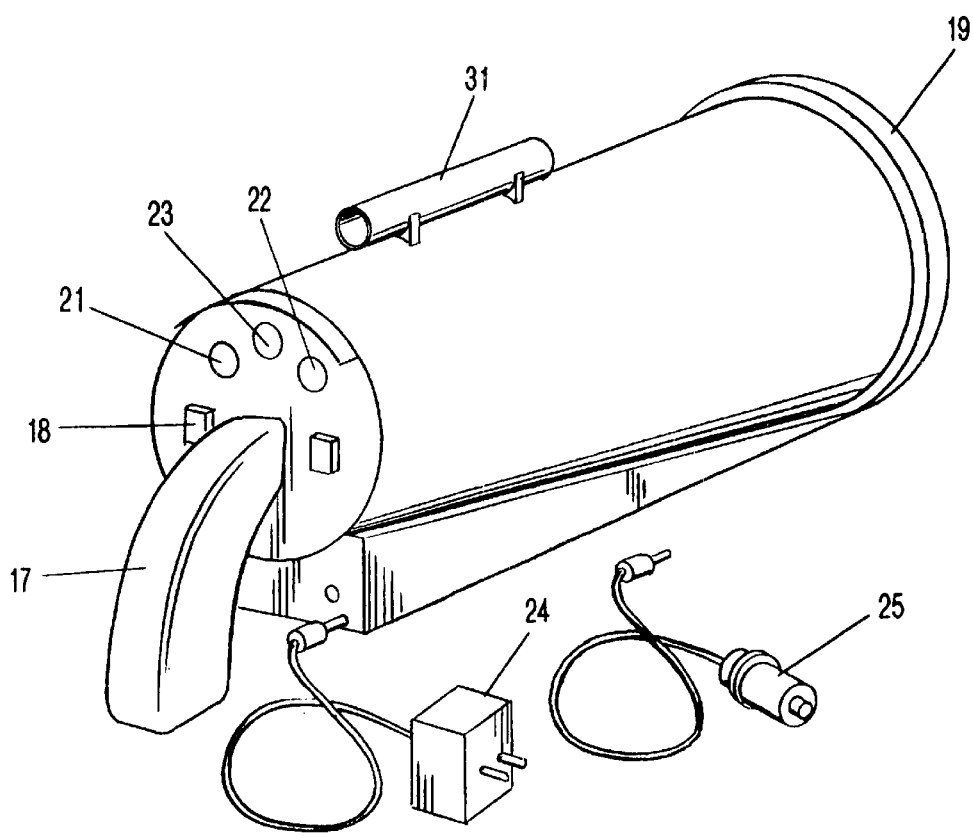
FIGS. 2A and 2B illustrates the hand-held concealed weapons detector of the invention of FIG. 1.

DESCRIPTION OF THE PREFERRED EMBODIMENTS (BEST MODES FOR CARRYING OUT THE INVENTION)

The weapons detection system of the present invention uses a short-pulse radar approach that is stepped over a series of frequencies. The system preferably comprises a trigger, pulser, broad band antenna, amplifier and signal processor. The radar first enters the range finder-mode to determine the distance to the target being surveyed. The range information is used to set the gain of the amplifier so that the output is normalized to range. This normalization permits the waveform returned from the target to be analyzed independent of range. The use of the range gate eliminates background clutter or scatter from overriding the return from the target. The system uses a low voltage pulser to produce a series of microwave pulses transmitted on a compact, broad band antenna. The reflected waveform is returned from the target through the same antenna. The received signal is range-gated and converted to an IF signal. The signal is amplified in the IF amplifier and is then envelop-detected. The detected signal is then amplified in a video amplifier and widened in time using a sample and hold circuit. The stretched signal is sampled by an analog-to-digital converter. The digitized output of the sampler is processed by the signal processor, preferably by a neural network. The signal processor makes a detection decision based upon whether the waveform it has received is similar to waveforms it has been trained on when a weapon is present and when there is no weapon present. If the output of the logic processor results in a positive detection decision, indicating a high probability that a weapon is present, a signal, such as a red-colored light emitting diode (LED) is illuminated on the system's display panel and a series of audible tones are also engaged (or other appropriate alarm (s)). If the output of the signal processor reaches a negative decision, indicating a high probability that no weapon is present, a signal, such as a green-colored LED is illuminated on the system's display panel (or other signal(s) given). If neither decision is reached, a signal, such as a yellow-colored LED is illuminated on the system's display panel (or other signal(s)), indicating the operator should use caution and ask the subject to turn (e.g., at a series of 90-degree angles) until a detection decision is achieved.

The present invention provides for the detection of concealed weapons on the human body, under clothing or garments, and inside handbags. The invention provides for the discrimination of firearms from other metallic scatterers, such as belt buckles, jewelry, watches, metal buttons, and coins. In one embodiment, the system design is optimized for the requirements of a hand-held device used by law enforcement and security personnel to detect concealed weapons at ranges between approximately three yards and fifty yards. Specifically, the system design includes low power circuitry used to produce a microwave pulse that is transmitted on a compact, broad band antenna. The same antenna receives a backscattered signal from the surveyed target and the clutter environment. A signal processing unit implements a detection algorithm that is used to process the backscattered signal to discriminate and identify the signature of a firearm or a large knife blade against the clutter background of the human body and a random assortment of small, metallic scattering objects such as jewelry, belt buckles, coins, etc.

The portable, hand-held embodiment of the invention (see FIGS. 1–2) is designed to be lightweight. It preferably employs batteries (e.g., 4 C-cell batteries) as its power supply. The portable embodiment may have both the LED and LCD displays for its information output. A backlit LCD panel can display a wide variety of information, including battery condition and distance to target as well as when a decision has been made.

An alternative embodiment is a door unit using, preferably, phased antenna arrays to survey individuals as they approach a door from approximately three to five yards away. If a handgun is detected, a barrier can activate, such as an electronic lock which is activated to keep the armed individual from entering an area. Security personnel can also be alerted through a discrete paging system or by an audible or visual or vibrating alarm. A camera (optional) can also be installed to take photos or videos of individuals who are detected carrying concealed weapons.

For a clearer understanding of the operation of the portable embodiment of the present invention, attention is initially directed to FIG. 1. Specifically, the law enforcement officer 11 points the concealed weapons detector (CWD) 12 at the suspect 13. The CWD emits microwave energy 14 at the suspect. The backscattered signal 15 that contains the information about the suspect is then received by the CWD. The CWD then notifies the law enforcement officer as to the presence or absence of a concealed weapon 16 on the body of the suspect.

Figure 2B:
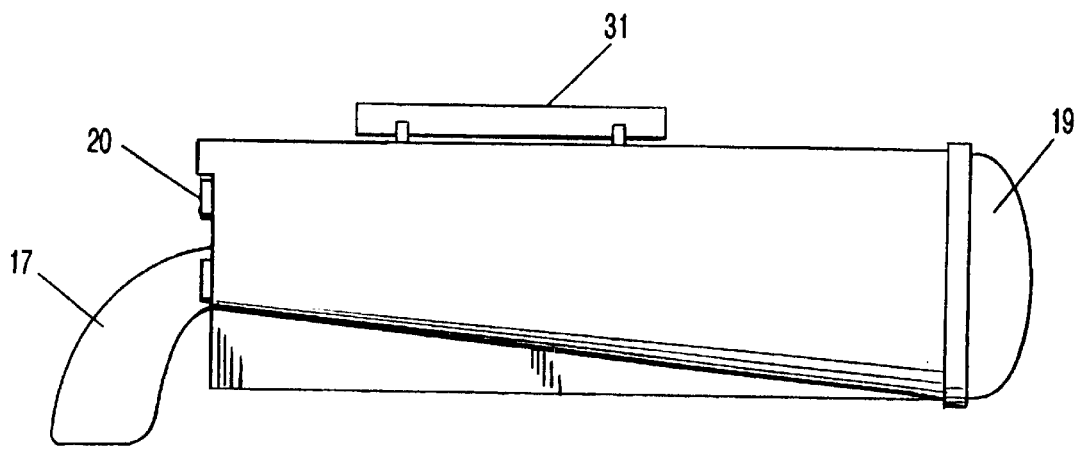

FIGS. 2A and 2B include a handle-grip 17, trigger 18, transmit and receive antenna 19, and a light-emitting diode display 20, which indicates the presence 21, absence 22, or indeterminate detection of a weapon 23. The unit is portable. The internal power supply battery may be recharged through an alternating current adapter 24 or off a motor vehicle power system adapter 25.

The system includes a transmitter which sends microwave energy toward the suspect to be surveyed. The transmitter output includes the frequencies at which metal parts of a firearm will self-resonate. The microwave energy backscattered by the human body and the objects surrounding it is received by the receiver. The characteristics of the received signal determine whether or not a firearm is present on the suspect. The characteristics of the received signal may include a relative increase or decrease in amplitude and shifts in phase as a function of frequency. The system includes a processor which determines whether or not the characteristics of the received signal are consistent with the presence of a firearm.

Various transmitter and receiver configurations may be utilized. The transmitter output may be stepped or swept-chirped in frequency.

The transmitter output may be broad band, or it may be swept across the range of possible resonant frequencies. Similarly, the receiver may be wide band or may be swept across the set of possible resonant frequencies. The transmitter and receiver cannot be broad band in the same system because this precludes distinguishing among the various resonant frequencies. If both transmitter and receiver are being swept, they must be operated in synchronism.

Figure 3:
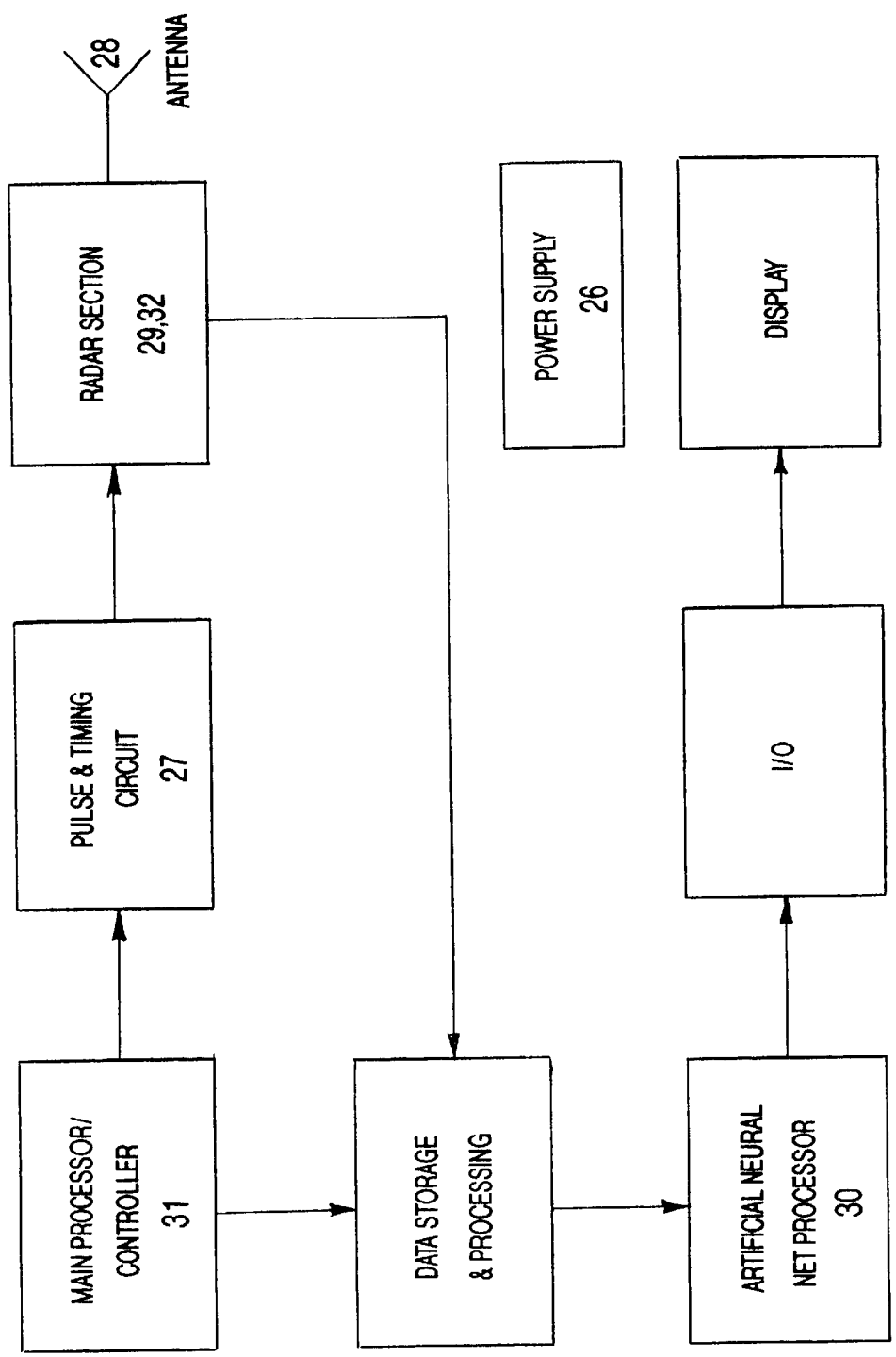
FIG. 3 is a block diagram of the system components of the weapons detector of the invention.

FIG. 3 is a block diagram of the system components of the preferred embodiment. The CWD includes a power supply 26 which provides power to the other system components. The transmitter includes a pulser 27 that is coupled to a broad band antenna 28. Typically, the output pulse is approximately 10 nanoseconds wide and has rise and fall times on the order of 1 nanosecond. The receiver 29 is preferably a conventional superheterodyne receiver with a very wide IF bandwidth, in the order of 400 MHZ. This is to preserve the pulse rise time. The output of the receiver is preferably connected to a signal processor 30.

In the preferred embodiment, the output from the range finder 31 is used to normalize the amplitude of the received signal. The range finder may be implemented as an acoustic, optical or microwave subsystem. The output from the range finder may be used to set the gain of the linear amplifier 32 in the receiver. Alternatively, the automatic gain control may be realized by adjusting the power of the transmitted signal, or by using the signal processor to scale the output of the receiver.

The signal processor may use one or both of two possible methods for the detection of a concealed weapon. The first method utilizes the specular backscatter from firearms located on the human body. In this method, the backscattered signal is higher in amplitude when a firearm is present. The second method utilizes the self-resonant scattering from the metal parts of the firearm.

Figure 4A:
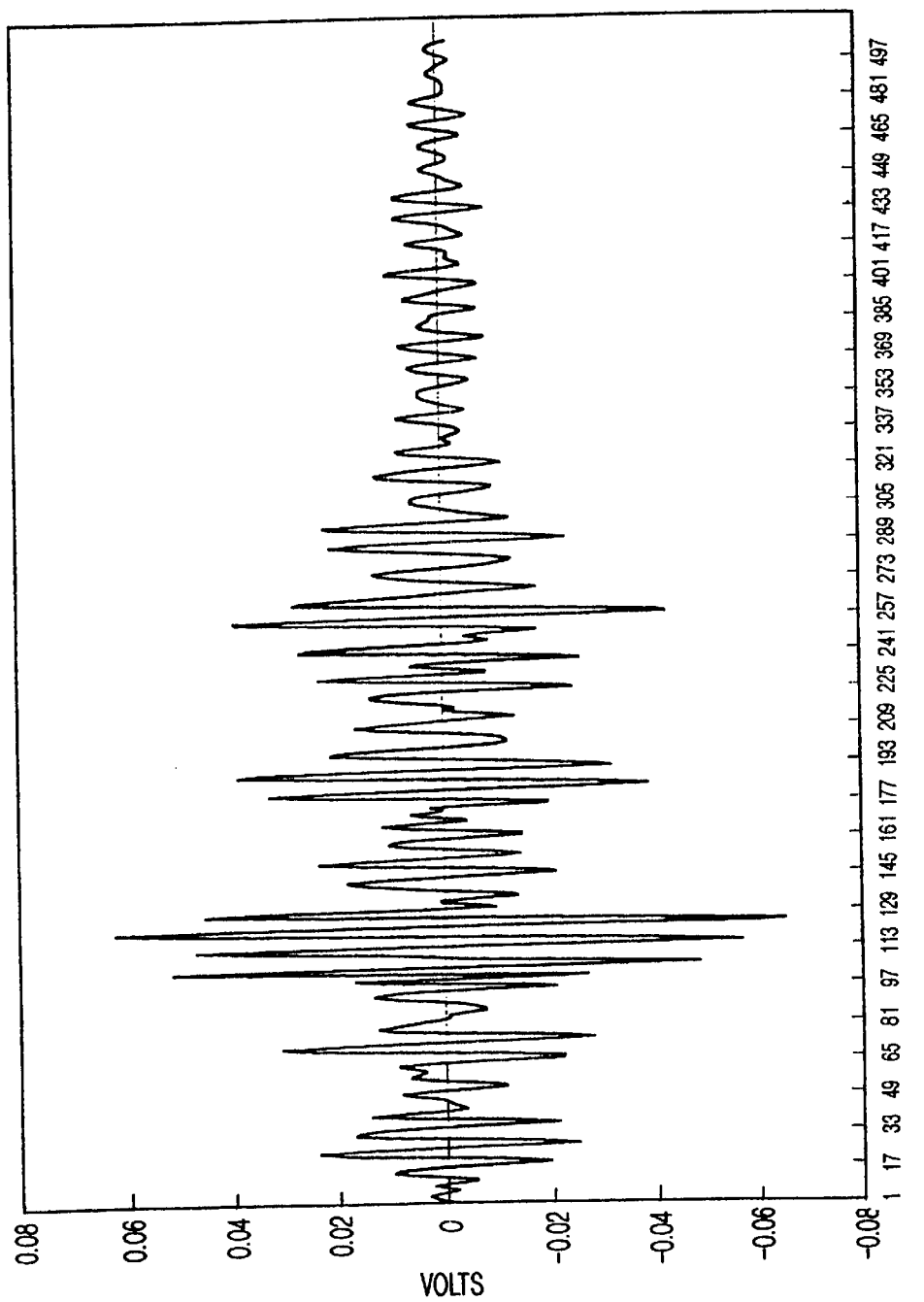
FIGS. 4A and 4B are graphical comparisons of the time-domain signatures of a human body with and without a firearm.
Figure 4B:
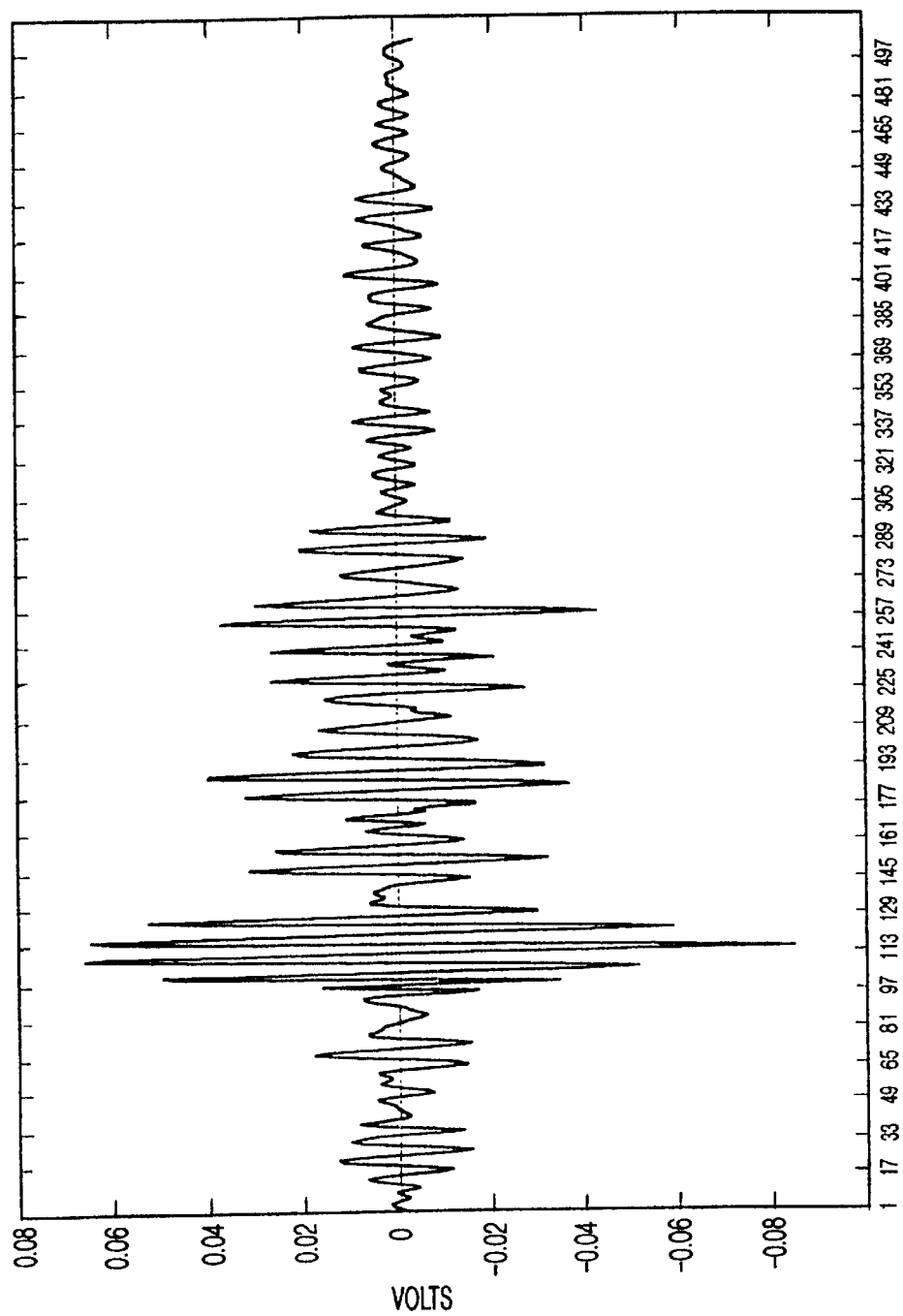
Figure 5:
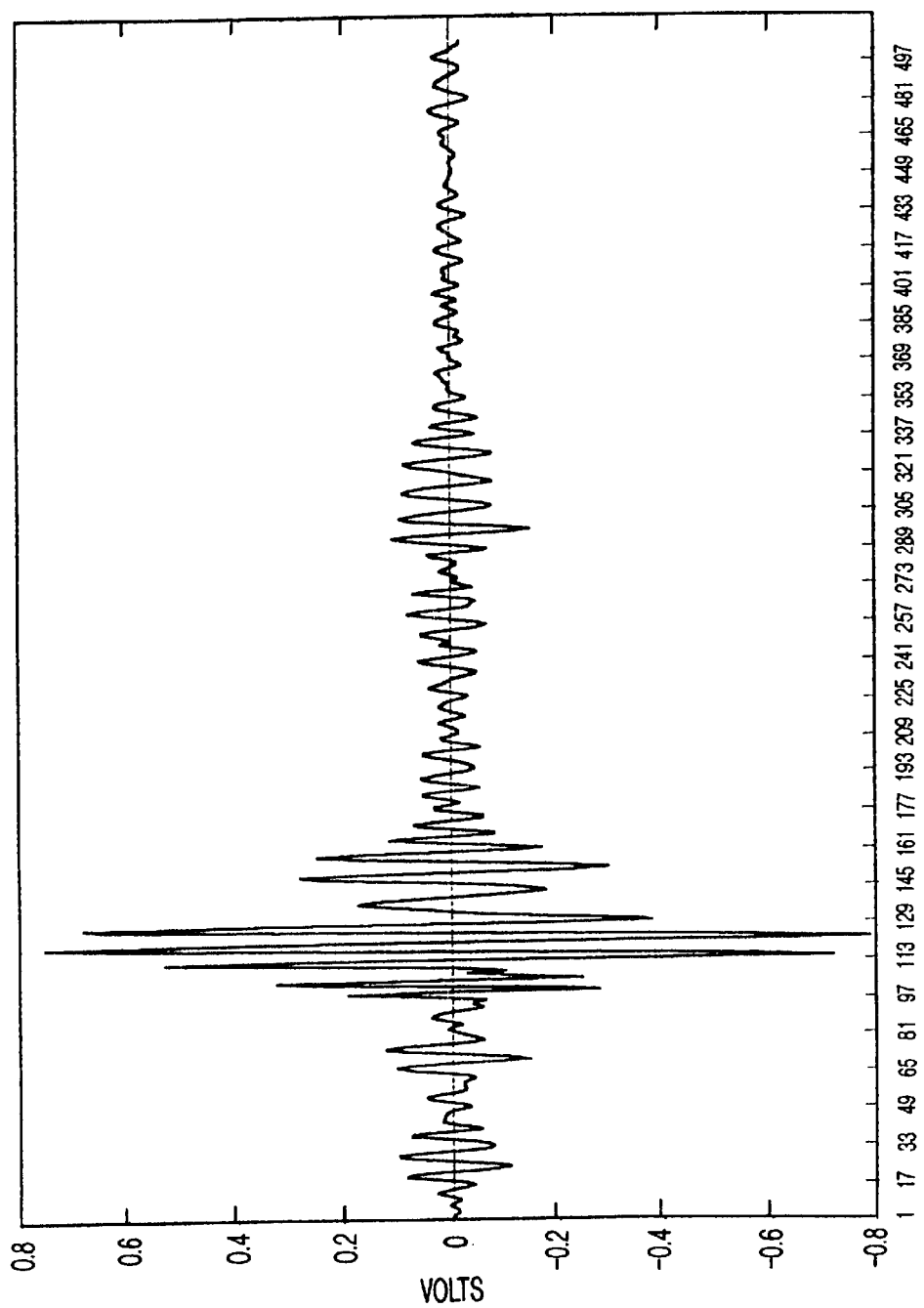
FIG. 5 provides the graphical difference of the time-domain signatures in FIGS. 4A and 4B.

A specific example of the output of the sampler is depicted in FIGS. 4A and 4B. FIGS. 4A and 4B are a graphical comparison of the time-domain signature of a human body with and without the presence of a firearm. The time-domain waveform in FIG. 4B depicts a higher magnitude echo due to the presence of the firearm. FIG. 5 is the graphical difference of the time-domain signatures in FIGS. 4A and 4B.

Figure 6B:
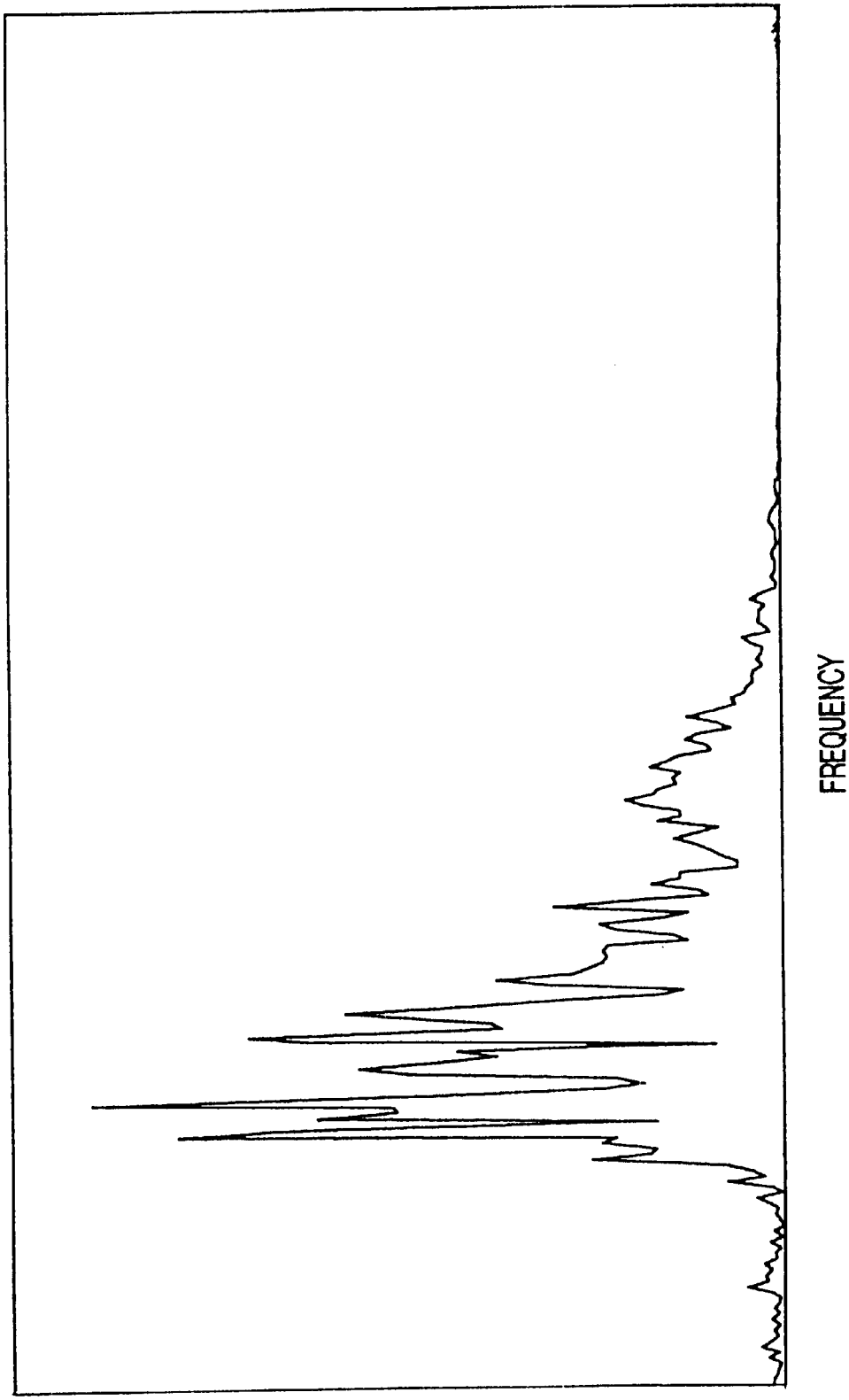

FIGS. 6A and 6B are a graphical comparison of the fourier transform of the time-domain waveforms of FIGS. 4A and 4B. The metallic parts of a firearm resonate at approximately one-half wavelength of the physical dimensions, independent of the orientation to the incident microwave energy. When a firearm is present, the backscattered waveform has higher frequency content. A comparison of FIGS. 6A and 6B show that a successful discrimination of the presence of firearms can be based upon the presence of the higher frequency content in the backscattered signal.

The signal processing unit may reach decisions using either or both of the detection approaches described above. In the preferred embodiment, a multilayer artificial neural network performs the signal processing task. The frequency-domain data from the receiver (which may be processed by fast Fourier transform) is presented to the input layer of the artificial neural network. The output layer of the artificial neural network drives the processor I/O circuitry which is connected to the light emitting diode display. The artificial neural network is trained to distinguish between the applied patterns at the input layer and then produces the desired response to the output layer. The artificial neural network may be simulated on a conventional microprocessor subsystem, or implemented in specialized integrated circuits or hardware accelerators.

Figure 7:
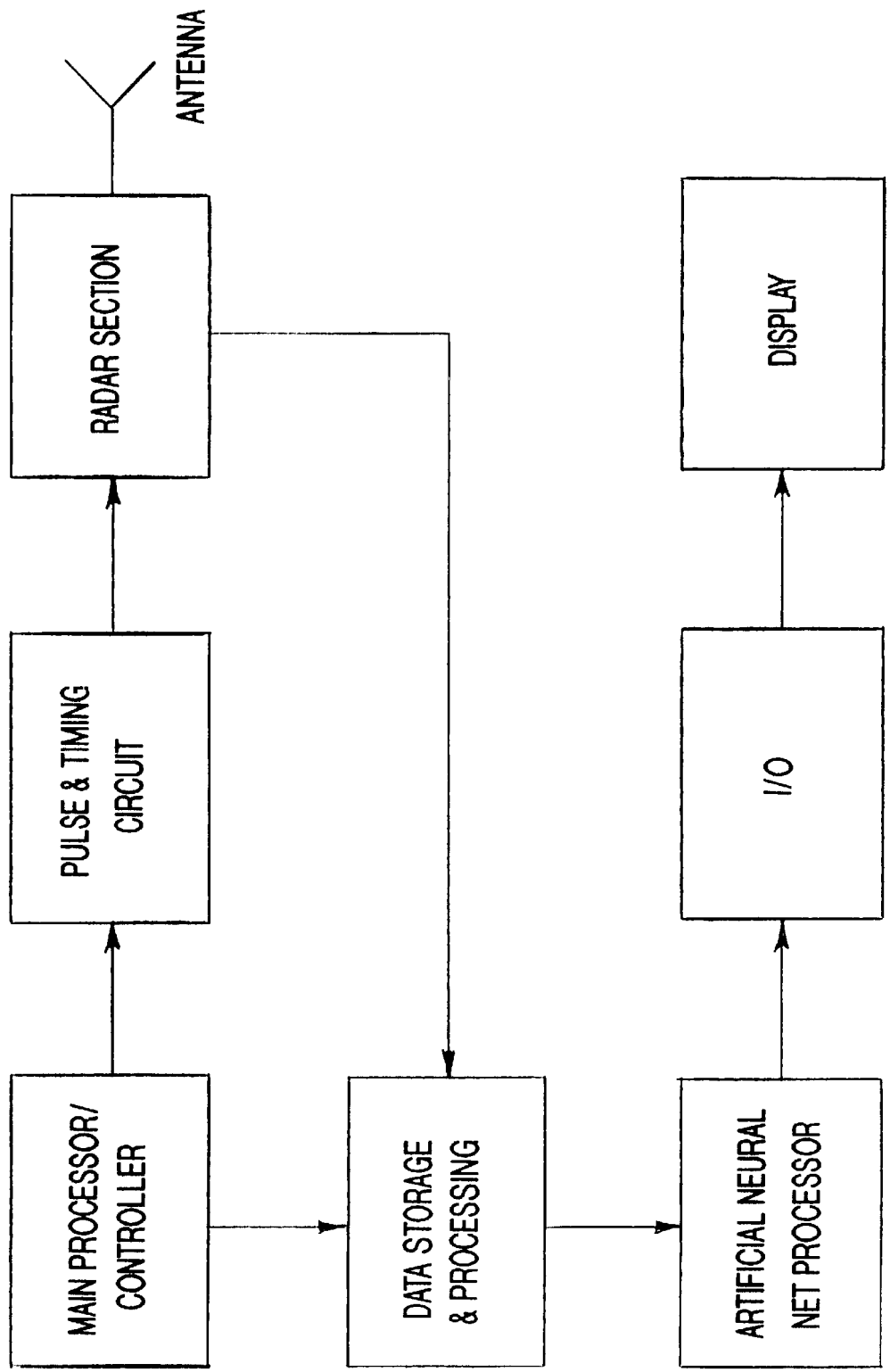
FIG. 7 is a top-level block diagram of the invention.

Referring to the top level block diagram on FIG. 7, the central control for the system is in the main processor/controller. That processor determines the actions required to fulfill the function of the device. Upon initiation by the user by pressing the trigger, the processor begins the measurement process. While initializing, the processor first illuminates all the LED indicators on the display. This serves as a check that the display is operating properly. Shortly after internal checks, the system enters the rangefinder mode. In this mode, the distance to the target is measured and a "range gate" is positioned so that only reflections at that range are measured. Reflections at other ranges are ignored, thereby diminishing returns from other objects, called clutter. After deciding on the range to the target, a test sequence is initiated which measures the radar returns from a target. Those returns are a function of frequency, which are read as a spectral pattern. That pattern is then compared to those learned by an artificial neural network processor and a decision is made as to whether or not a weapon is present in the field of interest. The entire process can be completed in less than one second.

Industrial Applicability

The invention is further illustrated by the following non-limiting examples.

Rangefinder

Figure 8:
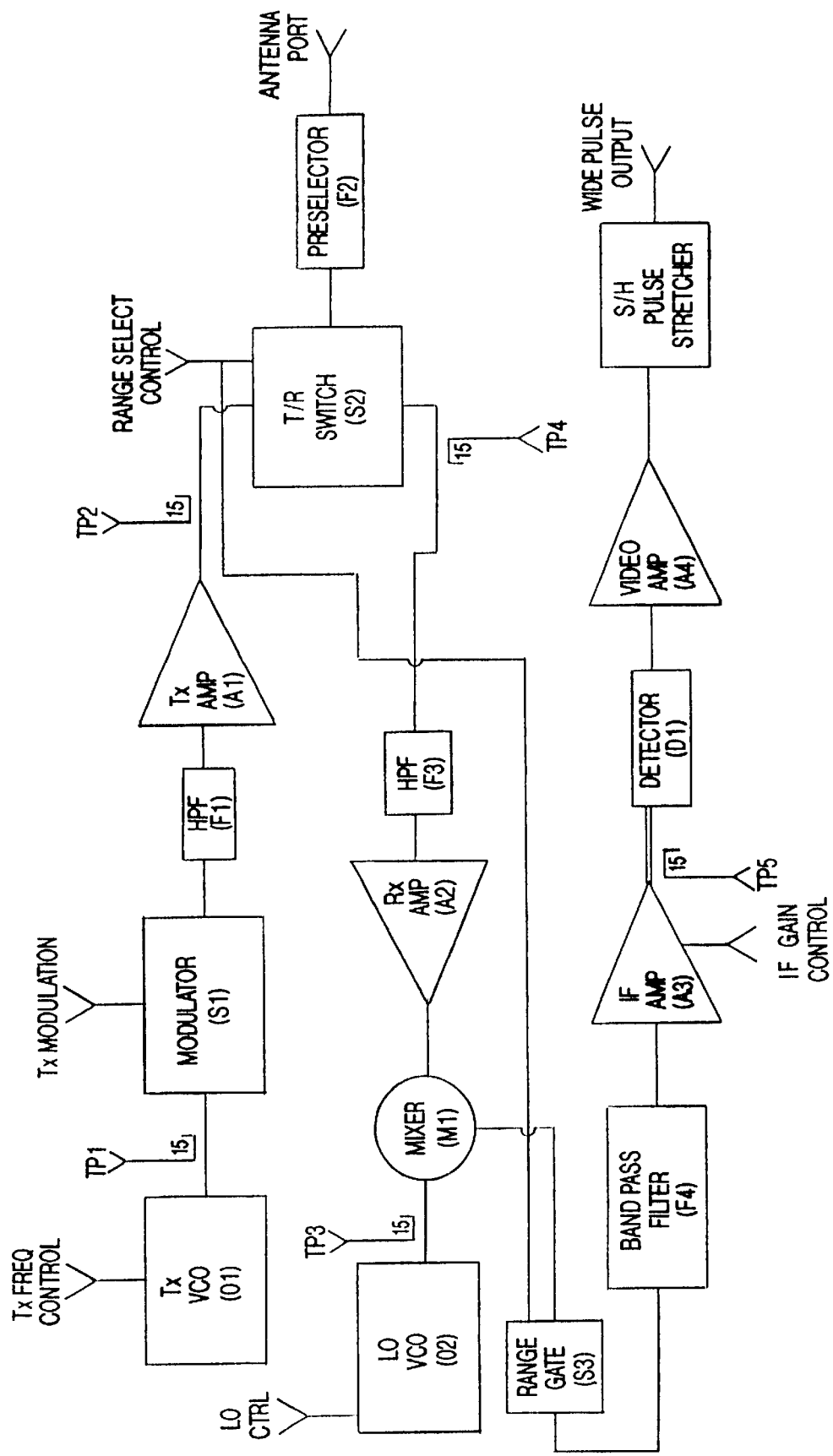
FIG. 8 is a block diagram of the radar section of the invention.
Figure 9:
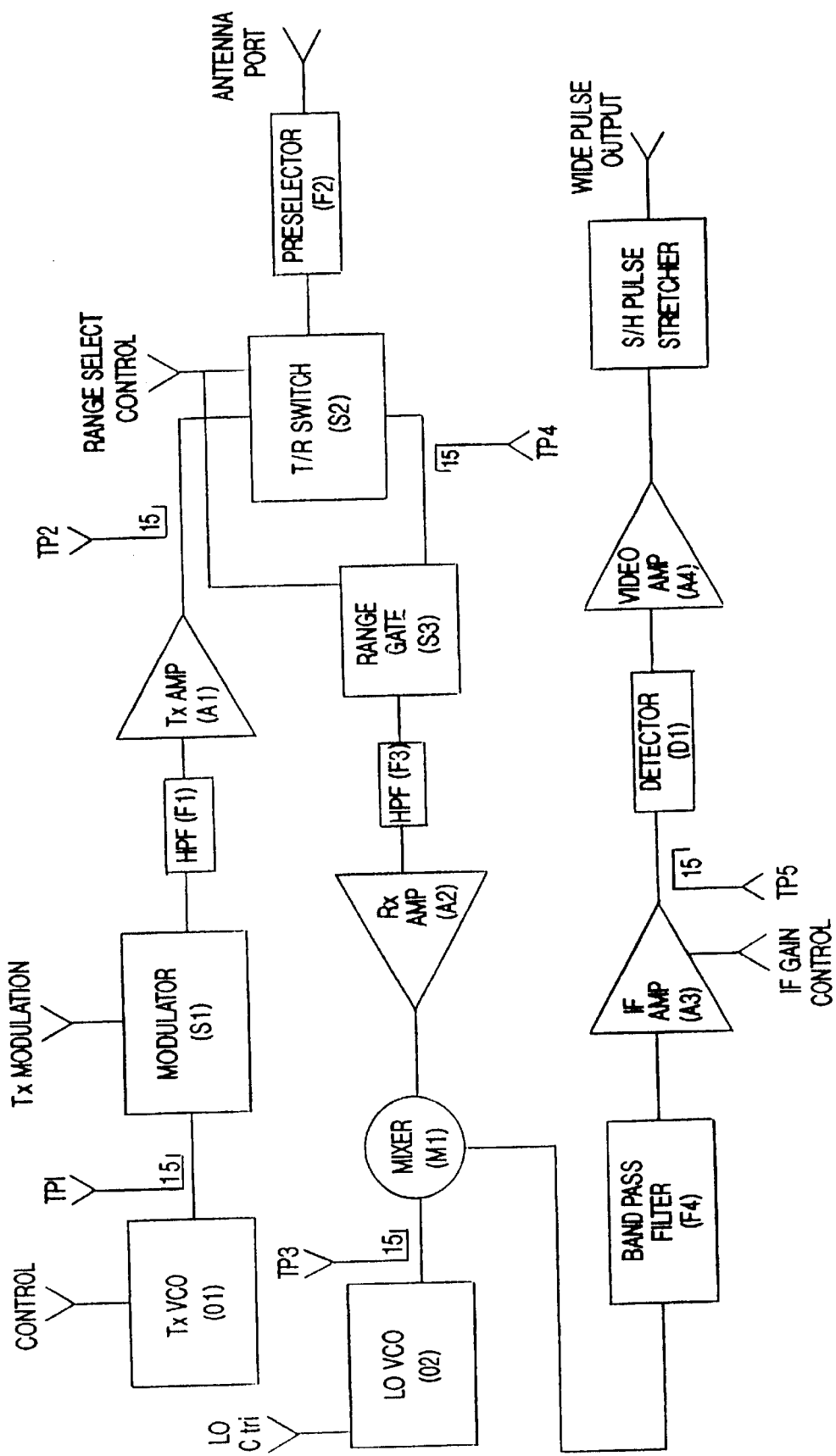
FIG. 9 is a second block diagram of the radar section of the invention.

The following is an example of the preferred operation of the present invention. Rangefinding accomplished by the method of the present invention (see FIGS. 8 and 9, which are alternative embodiments). The transmitter and local oscillators are tuned to the center of the test band and are normally held there for the duration of this process. A pulse (e.g., 10 nanoseconds) is then transmitted and the transmit/receive (T/R) and range gate switches are commanded to receive a pulse in the first range bin. Each range bin is one yard. The first range bin is the minimum distance at which the CWD is to operate (e.g., 4 yards). For the rangefinder function each range bin is set to a width (e.g., 2 yards) which corresponds to a receive pulse width (e.g., 12 nanoseconds). The first range bin is set to the distance (e.g., 4 yards), which requires a delay (e.g., 24 nanoseconds) between the transmit pulse and the range gate pulse. Radar range is 6 nanoseconds per yard. Thus, for this example, the transmitted pulse is 10 nanoseconds wide and the T/R/range gate control pulse is 12 nanoseconds wide and is delayed by 24 nanoseconds from the transmit pulse.

The return is digitized and stored in a memory location. A second pulse (e.g., one millisecond later) is transmitted but now the delay for the range gate is increased (e.g., by 6 nanoseconds), thereby sliding the range gate back one range bin. The return is measured and stored in the next memory location. This process is repeated until all twelve range bins have been measured. This takes approximately 12 milliseconds. The memory locations are checked to see if at least one has a signal greater than a predetermined threshold. If so, the entire process is repeated four more times so that a total of, preferably, 60 measurements has been made.

If, after the first pass through all the range bins, there is no signal above the threshold, the transmitter frequency is decreased by 50 MHz and the first pass is repeated. If there is still no signal over threshold, the frequency is increased by 100 MHz and the first pass is repeated. The purpose of the frequency shifts is to negate the effects of multipath cancellation which is a likely cause for insufficient radar return.

After a series of, e.g., five passes has been made (representing 60 measurements and data recordings), the range bins are polled. The time required for the passes (e.g., five passes) is preferably less than 100 milliseconds or 0.1 seconds. The polling process determines how many over threshold hits occurred in each range bin. The closest range bin with at least three hits is then selected as the range to target and an LED is illuminated to indicate that target lock has been achieved. The display then indicates the range to the selected target. This serves as a check for the operator that the desired target is being examined.

In this example, the processor then performs the following functions:

1. The range gate is reduced in width (e.g., 6 nanoseconds). This limits the range of measurement to one yard. One yard is considered sufficient to contain a person and yet narrow enough to reject clutter in other range bins.

2. The IF gain is adjusted for the range by "looking up" the bias required to achieve the desired gain. Data for the lookup table is determined by calculation and empirical testing during the manufacturing process.

3. The range gate delay is set for the selected range bin.

4. The transmit and local oscillators are set to their respective starting frequencies.

5. The weapon detection process is initiated.

The processor then commands the pulse and timing board to initiate a measurement sequence. That sequence consists of:

1. Open the transmitter modulator to transmit a pulse (e.g., 10 nanoseconds).

2. Count down to the time corresponding to the delay for the selected range gate.

3. Switch the T/R switch into the receive mode.

4. Simultaneously open the range gate switch.

5. Count down to the delay time for the analog to digital converter (AID) timing.

6. Trigger the AID to digitize the return signal and store the results in memory.

7. Command the oscillators to proceed to the next frequency in the test sequence.

8. Check and increment a counter.

9. If the counter value is less than a predetermined number (e.g., 50), wait for a period of time (e.g., one millisecond) and repeat the above steps 1 through 8.

10. If the counter value is the predetermined number (e.g., 50), reset the oscillators to their starting frequencies and repeat the entire sequence.

11. After the sequence is repeated (e.g., five times), average the results at each of the frequencies (e.g., 50 frequencies).

12. Feed the averaged data to the neural net processor for pattern matching.

13. Depending on whether or not a pattern is recognized, and its degree of certainty, illuminate the appropriate LED.

14. Keep repeating the measurement process as long as the trigger switch is depressed or otherwise activated.

15. Each time the frequency sweep is completed, the new data is placed in a shift register so that the newest data replaces the oldest data. This results in a continuous running average for a group of five frequency sweeps.

16. The new averaged pattern is fed to the neural net after each frequency sweep for pattern matching.

17. At any point where the pattern match decision changes, a new LED is illuminated.

Each time a new subject is to be scanned, the trigger or other activation mechanism should be released and re-depressed or deactivated and reactivated so that the rangefinder measurement is repeated, assuring that the new subject will be scanned.

Alternative Embodiments

The invention preferably operates by using a short pulse radar as the sensor to safely examine a subject. It generates a radar return pattern where the frequency of the interrogation signal is the independent variable. There are a variety of techniques which can be used to obtain such information. As described above, the preferred technique is to use a stepped frequency measurement. That is, the frequency band of interest is divided (e.g., into 50 points) and a measurement is made at each of the points. The data is then assembled to offer a pattern of amplitude versus frequency.

Other methods that can be employed in the present invention to acquire the same information are:

1. Chirped signal. A chirped signal is one where each pulse covers all or a portion of the frequency band by continuously changing the frequency of the carrier during each pulse. Since the pulses required for this application are very narrow, there are only a small number of rf or carrier cycles occurring during the pulse, and thus accurate measurement is critical.

2. FM-CW radar. A FM-CW radar technique is commonly employed for radar altimeters where precise distance measurements are desired. In this type of sensor the signal frequency is continuously varied in a linear fashion and the frequency change at the time of return is measured. A variation of this can be employed in the present invention where two signals are tracked at a frequency separation corresponding to the range to target but the amplitude variations of the return are sampled and measured.

3. Impulse radar. Impulse radar generates a very narrow pulse in the order or tens or sometimes hundreds of picoseconds (e.g., $10^{-12}$ seconds). Such narrow pulses contain energy over a large portion of the frequency spectrum. The spectral content for a rectangular pulse is a $\sin(x)/x$ pattern and the first null is at a frequency corresponding to 1/T. Therefore, if it is desired to have significant energy existing at a frequency of 3 GHz, then a pulse width of less than, e.g., 300 picoseconds is required. This means that all the data collection must occur in under, e.g., 300 picoseconds because the signal only lasts that long. This requires a system that is very expensive and difficult to realize.

4. Subcarrier radar. Subcarrier radar can use a higher frequency main carrier modulated with a microwave subcarrier in the e.g., 3 GHz range. The main carrier can be anywhere from the IR (e.g., 10 micron wavelength) through an X-ray range for clothing penetration.

Decision Making Criteria

The neural net processor of the invention makes a decision as to whether or not a weapon is present by comparing the pattern of signal returns in the band above e.g. 2 GHz to stored patterns. A weapon will tend to resonate in the 2 to 4 GHz frequency band and create a stronger return than other smaller objects. The criteria is that a signal exists which is greater in amplitude than the background but smaller than a calibrated large radar reflector.

Outputs and Indicators

Upon making a decision, the CWD can transmit its information in a very large variety of ways. One of the simplest methods is to illuminate a visual indicator, such as an LED. Equally simple are audible or tactile indicators. However, there will be many situations where neither of these signals is appropriate. In those cases, a signal can be transmitted e.g., over the air, via fiber optics, on electrical conductors, etc. Those signals can be used to activate a remote pager or receiver with e.g., an audible, visual or a mechanical movement. This can be used to alert selected individuals or to automatically energize a barrier (e.g., locking or other protective mechanism), or activate a camera to take a close-up photograph of the subject.

Different versions of the CWD can be produced to suit a variety of applications. For example, the hand held unit allows a police officer to examine a subject at a traffic stop, from a safe distance. Another embodiment is a unit that is fixed or mounted on a wall or above a portal. This embodiment is generally set to a continuous scan mode at a fixed range so that all individuals approaching the portal are screened. In a light traffic area, a passive detector, such as infra-red, can be used to trigger the CWD when someone approaches it.

In this situation, where a pager is activated, the screened individual does not know that he or she is suspected of having a concealed weapon. A guard who has been alerted by a pager can then assume a strategic position to prevent the detected individual from conducting any criminal activities. If an erroneous reading is obtained or if the individual has no intent of committing a criminal act, there is no harm done and no one has been accused of any activity. This type of operation is most useful in institutions such as banks, race tracks, jewelry stores, or places where large amounts of cash or valuables are concentrated.

In other situations, where an intentional indication is desired, the approached door can be locked, an audible alarm (either recorded or synthesized voice or buzzer) can sound, or a light can flash, etc. This type of response may be most desirable for 24 hour convenience stores, airports, court houses, bars, tourist attractions, etc.

Microwave/Radar

Figure 10:
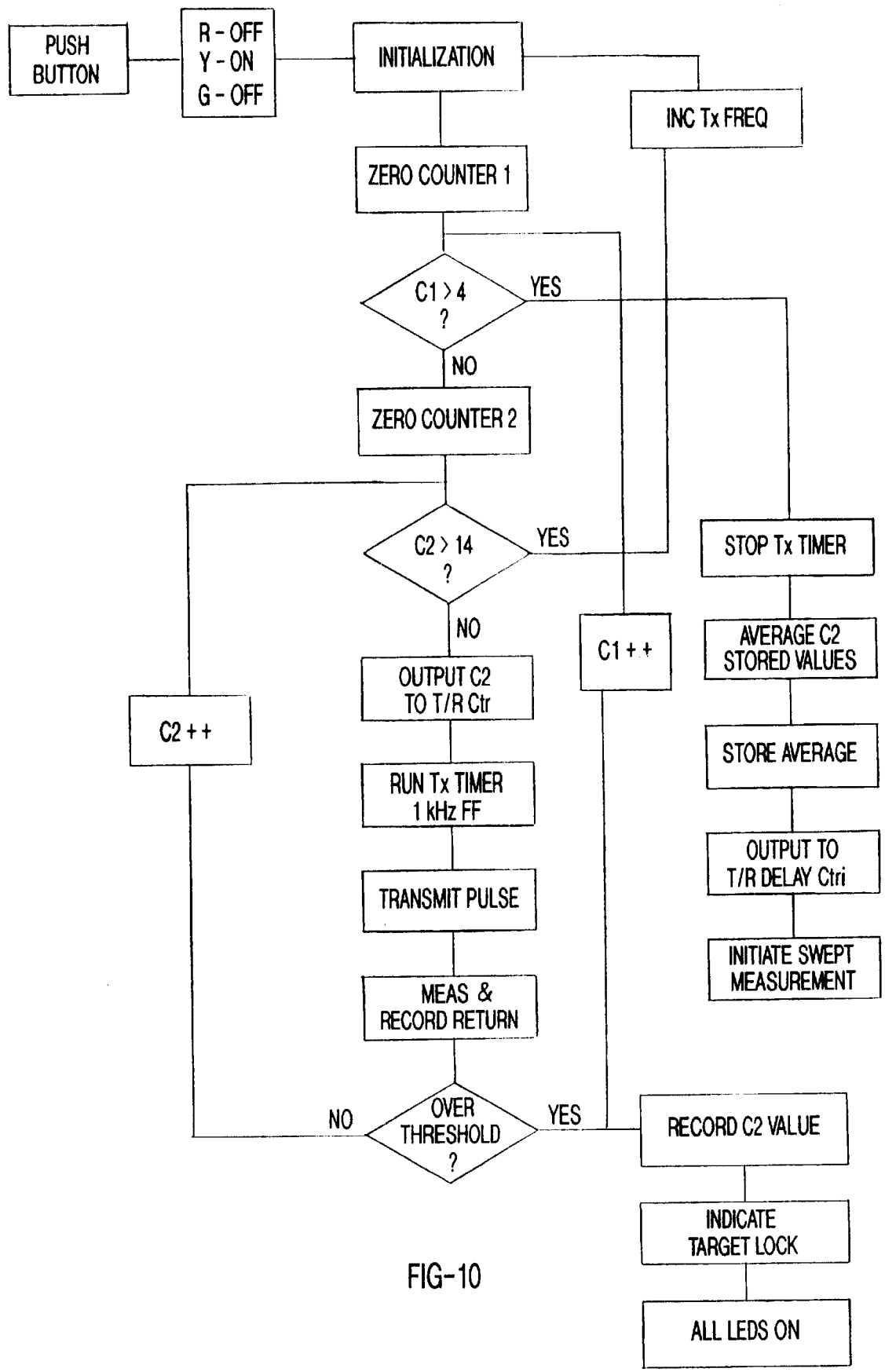
FIG. 10 is flow diagram of the preferred rangefinding method.

Refer to the block diagram, FIG. 10, to assist in understanding the microwave/radar section.

Transmitter

The transmission signal is derived from the Tx voltage controlled oscillator (VCO), O1. That signal is fed to a modulator to change the CW waveform into a series of pulses (e.g., 10 nanoseconds). The resulting Tx signal is a pulse train that is tuned over a certain range (e.g. 2.90 to 3.15 Ghz). The pulses occur at a e.g., 1 Khz rate and the frequency is stepped an increment of e.g., 5 Mhz for each pulse. Each measurement consists of 51 readings, each at a new frequency (incremented 5 MHz from the previous one). Thus, a complete measurement spans a range of e.g. 250 MHz. The processor averages a group of e.g., 50 measurements to make a decision. The tuning voltage to O1 is generated in the timing circuit and is a staircase waveform. This is adjustable in amplitude, offset and linearity. Each step occurs right after each reading to provide maximum time for O1 to tune and stabilize at the next frequency.

The transmission signal is modulated in switch, S1. The signal from O1 is CW and the modulation signal is generated in the timing circuit. The modulator is followed by a high pass filter, F1, to block the video modulating signal energy that will leak out of the modulator output connector from arriving at the output power amplifier. The pulse (10 nanoseconds) modulated signal is then amplified to e.g., about +23 dBm and is applied to the transmit/receive (TIR) switch, S2. This switch is normally held in the transmit position and is switched to the receive position at a precisely delayed time after the modulation pulse is applied to S1. This delay is in the range of e.g., 24 to 90 nanoseconds. It is held in the receive position for a duration of either e.g., 6 or 12 nanoseconds thereby providing some range gating function. S2 is followed by a second range gate switch, S3, that operates in unison with S2. S3 may be eliminated if sufficient isolation can be achieved on S2 to reduce zero time leakage to an acceptable level. S3 and S2 will pass a signal to the low noise RF amplifier, A2, for the duration of the time that it is desired to receive a radar return.

The common port of the T/R switch, S2, is connected to the antenna port. A preselector filter, F2, is placed in this path. That filter attenuates spurious signals and harmonics created by the transmitter oscillator/modulator/amplifier combination and prevents out-of-band extraneous signals from entering the receiver. That filter has a e.g., 1 dB pass band of e.g., 2.85 to 3.25 GHz. The antenna port is an SMA female connector.

Receiver

A high pass filter with a cutoff of e.g., approximately 1.7 GHz is included to block video pulse leakage from the T/R and Range Gate switches from reaching the low noise amplifier, A2. The return signal is amplified in RF amplifier, A2, that has a gain of e.g., 20 dB. The amplified signal is fed to a double balanced mixer, M1.

The local oscillator for the mixer is derived from a second VCO, O2. This oscillator is offset from O1 by e.g., 700 MHz. That is, it tunes from e.g., 2.20 to 2.45 GHz. It is synchronously tuned with O1 to maintain an IF output centered at e.g., 700 MHz. O2 is stepped in e.g., 5 MHz increments along with O1. It's tuning voltage is also generated in the timing circuitry. The IF signal is filtered in a bandpass filter, F4, centered at e.g., 700 MHz and has a bandwidth of e.g., 400 MHz. Its passband is e.g., 500 to 900 MHz. This bandwidth was selected in order to maintain the quality of the fast rise, narrow pulses required to retain range resolution. The filtered IF signal is then amplified in a variable gain IF amplifier, A3. The gain control is an analog e.g., 0 to 5 volt signal with maximum gain occurring at e.g., 0 volts. The gain control is generated by the processor and is derived from the range to target information. That is, as the range gate delay is increased, the IF gain is increased. This provides radar sensitivity time control (STC) and compensates for the fact that a target at longer range will result in a weaker return. The gain of the IF amplifier can be varied from e.g., about 15 to 65 dB. A change in return due to a range change of e.g., 4 to 15 meters, for a target of constant radar cross section, is e.g., 23 dB. The change over e.g., 3 to 15 meters is e.g., 28 dB. Thus, a range of e.g., 50 dB has sufficient margin to accommodate a wide range of calibrations and not be the limiting factor in achieving the desired range. This margin may be reduced if a cost savings can be realized.

The IF pulsed signals are detected in a high speed detector, D1. The current instrument uses a back diode and is a combination of detector, low pass filter and matching pad. The detector assembly cuts off at a frequency between e.g., 300 and 500 MHz to attenuate the IF carrier far below the pulse envelope. The pulse envelope is then amplified in a video amplifier, A4. The video amplifier has a gain of e.g., 40 dB to bring the detected video signal which typically has a peak value of some tens of millivolts, (e.g., 40–50 mV) up to a level of e.g., 4 or 5 volts. These pulses are then stretched in an asychronous sample and hold circuit to increase their pulse width from e.g., 10 nanoseconds to approximately 50 microseconds. At about 15 microseconds into the pulse, the digitizer (analog to digital converter) reads the level and produces a digital representation of the signal amplitude. That output is a coaxial connector to facilitate the use of a shielded cable, thereby preventing extraneous pickup and noise from influencing the measurements.

Test Points

Test points are shown and are to be included for monitoring and trouble shooting the circuit after it is integrated into a one-piece assembly. Troubleshooting is near impossible once the connectors are eliminated and the components connected via printed transmission lines. The test points are derived from directional couplers placed at strategic points in the circuit. The first point, TP1, is placed at the output of O1. This will permit observation of the base oscillator CW signal, prior to any applied modulation. Such observations will permit easy measurements of the frequency of each step, the power level and the Tx signal stability. The second test point, TP2, is placed after the Tx output amplifier. This location will permit observation of the modulation timing, the transmitted signal waveshape, output peak power and pulse width.

The third test point, TP3, is placed at the output of the T/R switch. Signals will only be observable at this test point when the target is very close to the radar. It will however, serve as an accurate timing reference for a base line range gate from which other ranges can be calibrated. It will also permit observation of all reflected signals from mismatches and close in clutter. The forth test point, TP4 is at the output of the local oscillator. This will permit observation of the output of O2 for checking linearity and tracking to O1, along with the mixer drive levels. The fifth test point, TP5, is placed at the output of the IF amplifier. This location will provide information on the conversion loss of the mixer and the gain of the IF amplifier to ascertain linear performance of the receiver. A value of e.g., 15 dB is chosen for the test point couplers to minimize the insertion loss of each device.

Mechanical

Figure 11:
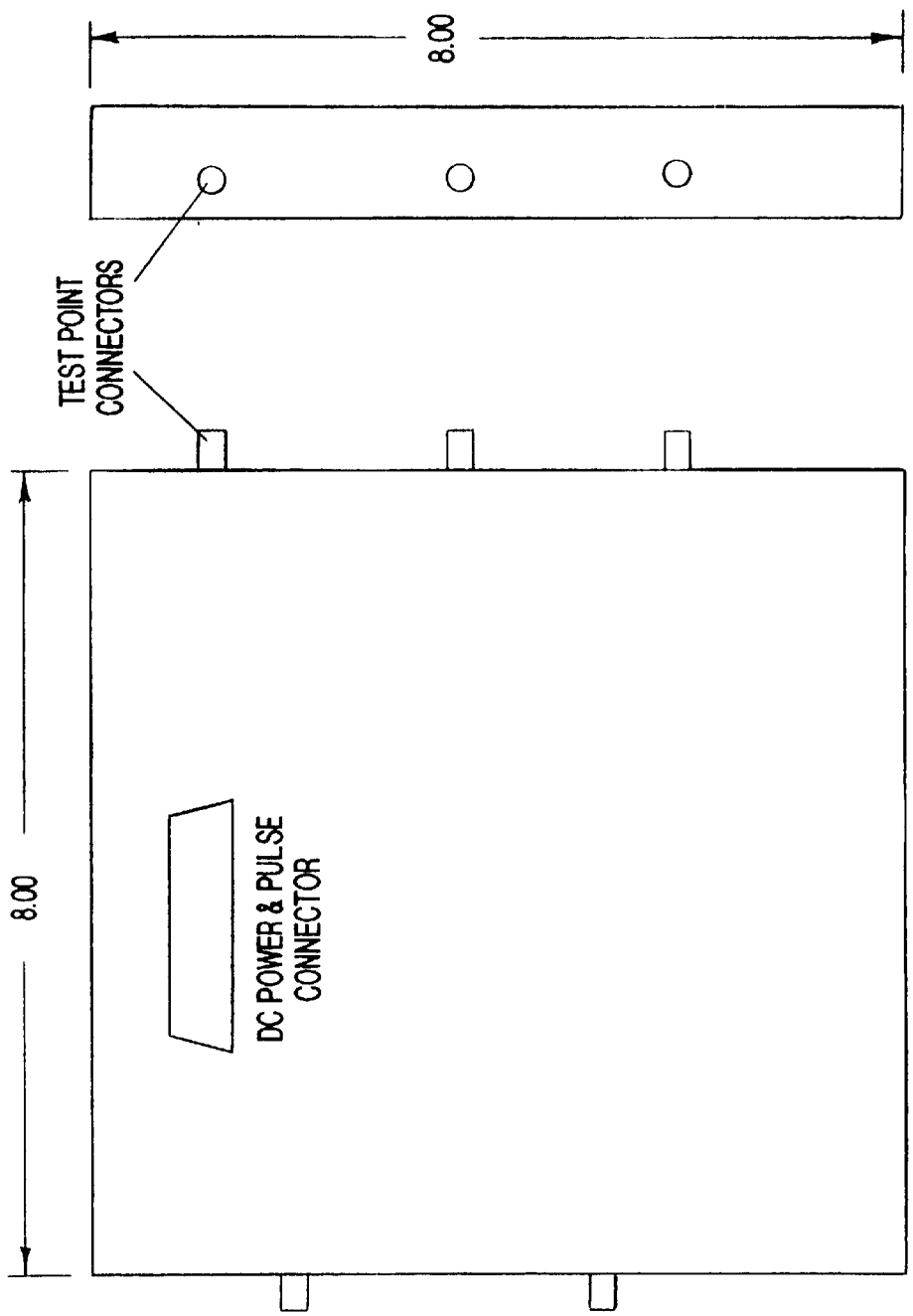
FIG. 11 is an outline diagram of the preferred radar microwave section of the invention.
Figure 12:
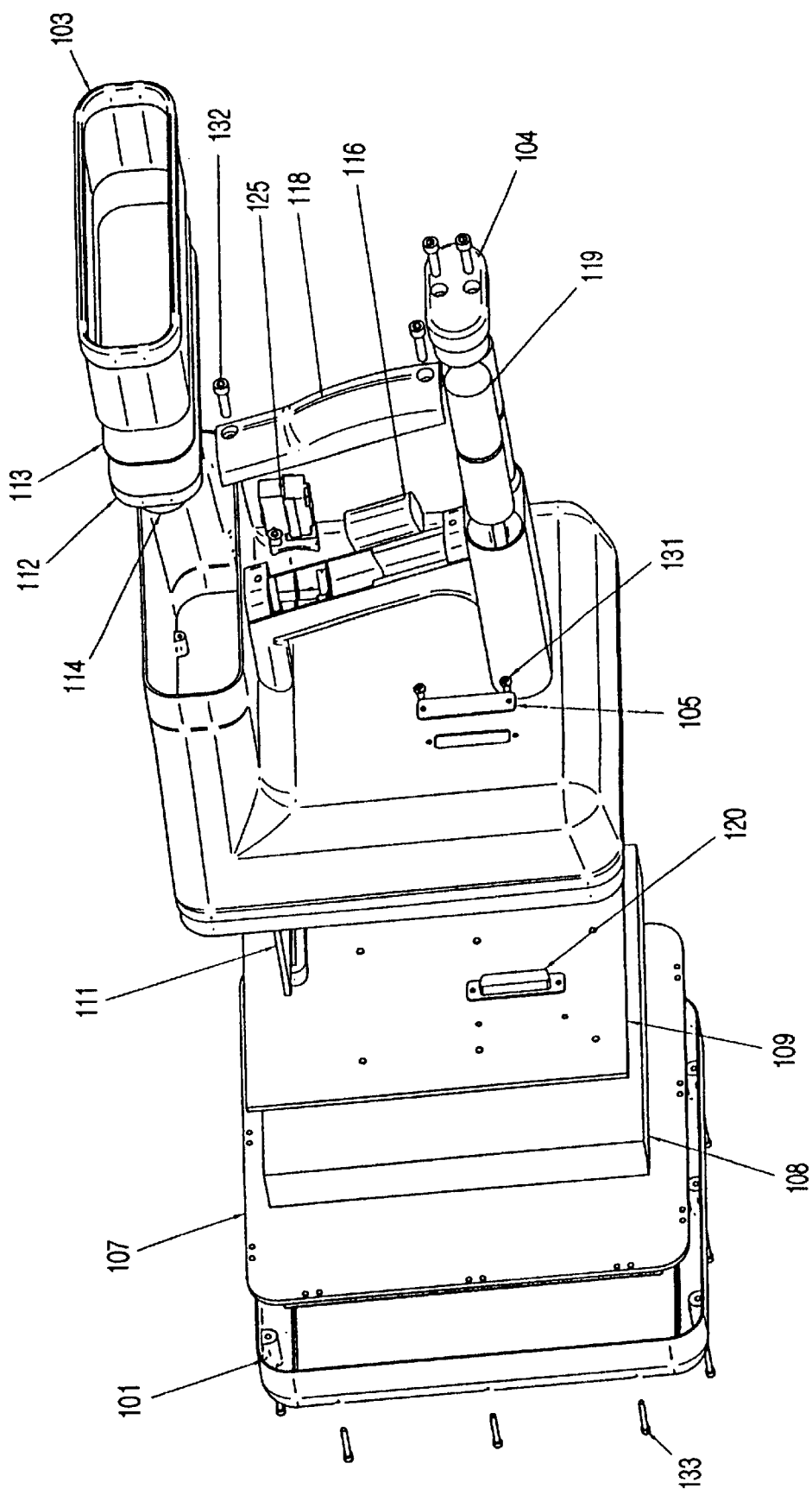
FIG. 12 is a left lower rear perspective exploded view of the preferred embodiment of the invention.
Figure 13:
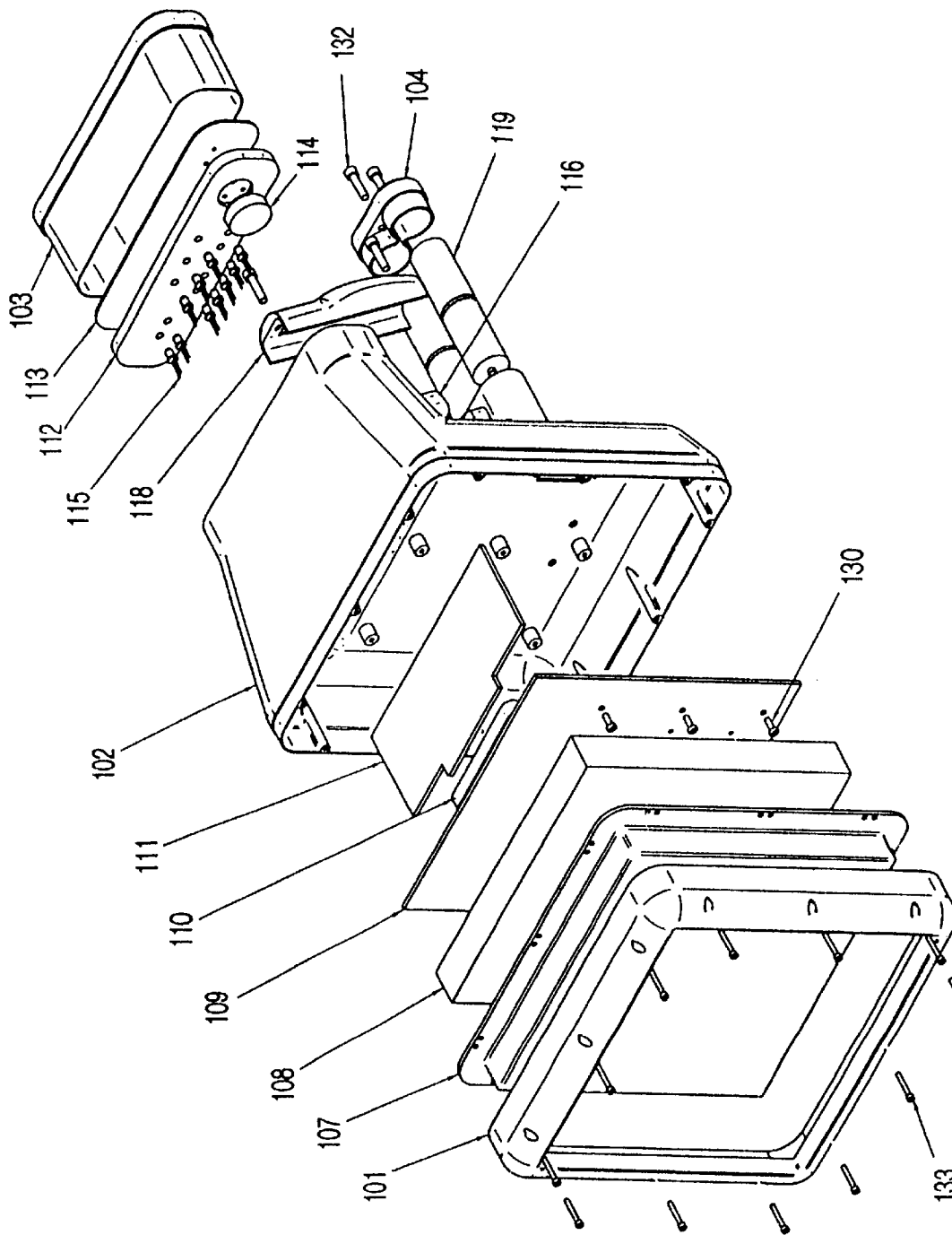
FIG. 13 is an right upper front perspective exploded view of FIG. 12 embodiment.
Figure 14:
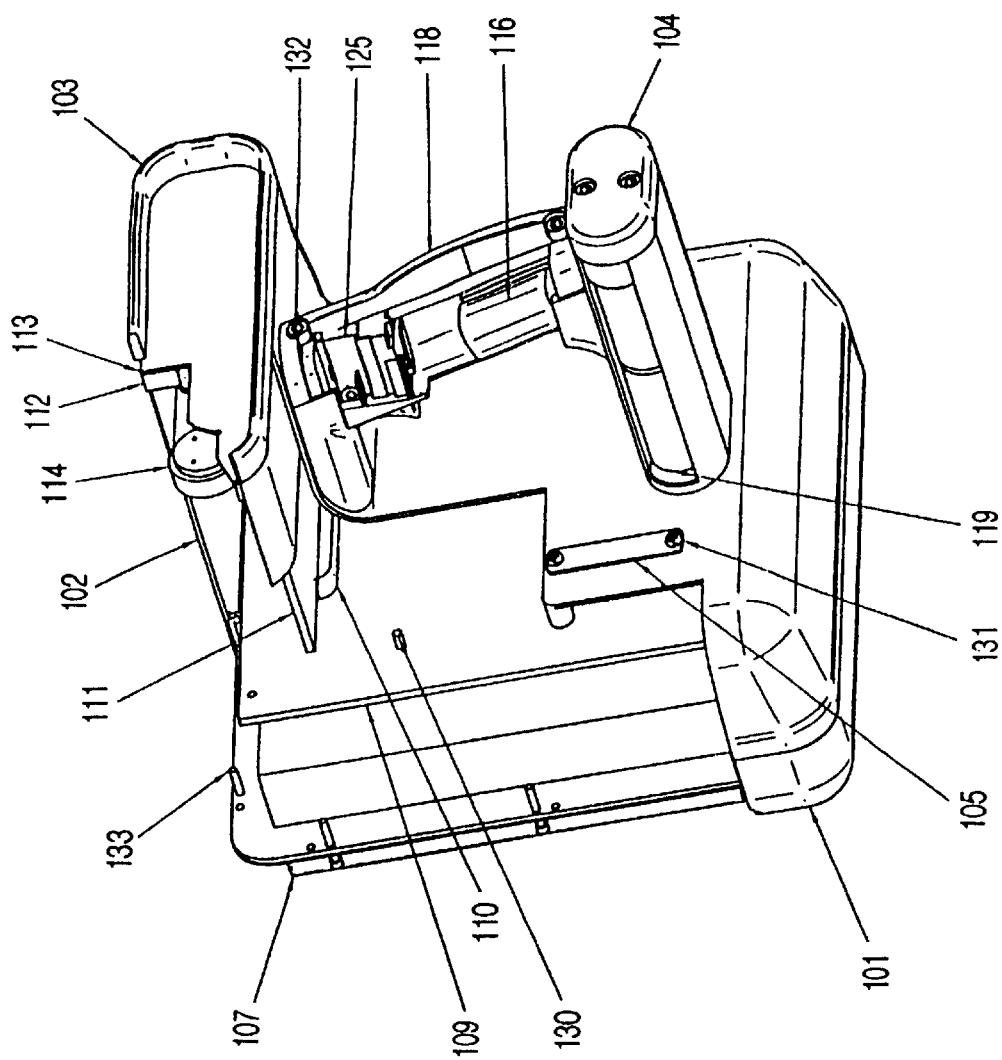
FIG. 14 is a left lower rear perspective partial section view of the FIG. 12 embodiment.
Figure 15:
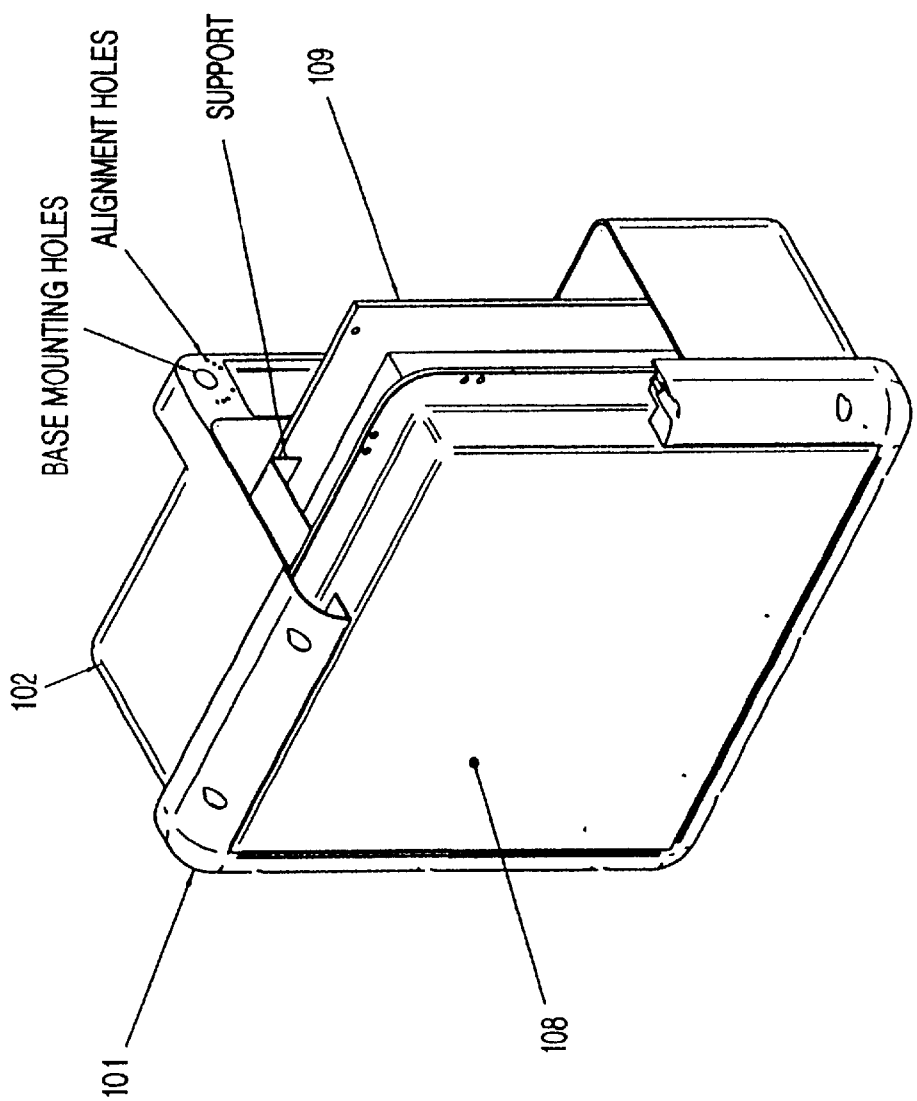
FIG. 15 is a right upper front perspective partial section view of FIG. 12 embodiment.

The outline of the preferred microwave assembly is shown in FIG. 11. The overall package preferably fit into a footprint of, e.g., 8×8 inches and is less than, e.g., 1 inch high. The antenna port is preferably an SMA female connector and is cabled to the antenna input. However, it is highly desirable to have the antenna blind mate to the RF unit at final assembly. The high speed connectors which input the modulation and T/R signals are preferably coaxial, such as SMCs. The five test ports are preferably SMA female. The low frequency inputs which include the Tx and LO tuning controls and the IF gain control are preferably integrated into a multipin connector. A second multipin connector is used for the power supply dc inputs.

Summary

A summary of the preferred specifications described herein is shown in the following tables.

TABLE 1a

Summary of Preferred Operational Specifications

| Parameter | Specification |
|---|---|
| Transmission Frequency Range | 2.90 to 3.25 GHz |
| Peak Power Output (to antenna) | +20 dBm |
| Pulse Width | 10 nanoseconds nominal |
| Pulse Rise/Fall Times | 1 nanosecond |
| Pulse Repetition Frequency | 1 kHz, capable of 10 kHz |
| Spurious Outputs | −30 dBc |
| Receiver Noise Figure | 6 dB max |
| 3rd Order Intercept | +20 dBm |
| Receiver Noise Floor | −83 dBm |
| IF Gain | Voltage variable from 15 to 60 dB |
| Preselection | 2.8 to 3.4 GHz, 6 section Butterworth |
| IF Frequency and Bandwidth | 700 MHz center, 400 MHz bandwidth |
| Size | Approx 8 × 8 × 1 inches, exact TBD |
| Weight | 1 lb max. |
| Antenna beam width | 27 × 27 degrees |
| Antenna frequency range | 2.80 to 3.30 GHz |
| Antenna gain | 16 dB/min |
| Antenna size | Approximately 8 × 8 × .75 inches |

TABLE 1b

Inputs

| Parameter | Specification |
|---|---|
| Range Gate Delay | 18 to 90 nanoseconds |
| Range Gate Width | 6 or 12 nanoseconds |
| Range Gate Rise/Fall Times | <1.5 nanoseconds |
| Modulation and Range Gate Control Levels | TTL |
| Tuning Voltage to VCOS | approx 3 volts pk—pk, centered between 3 and 8 volts. |

TABLE 1b-continued

Inputs

| Parameter | Specification |
|---|---|
| IF Gain Control | 0 to 5 volts dc |
| Connectors | Modulator and Range Gate: SMC female Oscillator Tuning and IF Gain: Multipin, TBS |

TABLE 1c

Outputs

| Parameter | Specification |
|---|---|
| Pulse Output to Digitizer | Stretched pulses, 50μ seconds |
| Output Level | 5 volts peak for −45 dBm input at antenna port with IF Gain = 20 dB |
| Output Impedance | <50Ω |
| Antenna Port Impedance | 50Ω, VSWR 2:1 max. |
| Connectors | Antenna Port: SMA female Pulse Output: SMC female Test Ports: SMA female |
| Zero Time Leakage Level | <5 millivolts |

TABLE 1d

Environmental Requirements

| Parameter | Specification |
|---|---|
| General | Rugged Handling, Field Use |
| Operating Temp Range | −20 to +45° C. |
| Storage Temp | −40 to +70° C. |
| Shock | 50 g, 11 millisec half sine |
| Vibration | 2 to 2000 Hz, .05" displacement |
| Humidity | 0 to 98% RH |
| Altitude | 0 to 15K feet |

The preferred casing for the portable embodiment of the invention is illustrated in FIGS. 12–15. Components comprise transmitter/receiver, RF module 108, antenna 107, display control board 111, CPU and logic control board 109, display panel 112, screws 130,131,132,133, I/O connector 110, trigger switch assembly 125, trigger switch, switch frames, interface connector 120, display window 113, grip vibrator 116, "C" batteries 119, interface connector cover 105, power supply cover 104, display bezel 103, case 102, rear grip 118, front bezel 101, indicator LED 115, and ceramic buzzer 114.

This invention is particularly useful for detecting firearms and other weaponry, including but not limited to the following: 0.22 caliber revolver, 0.38 caliber revolver, 0.357 caliber revolver, 0.22 caliber sawed-off rifle, 0.380 automatic, 0.9 mm automatic, 0.22 caliber automatic, and pipe bombs or other cylinders. The invention is capable of discerning weaponry from clutter objects, including but not limited to: belt buckles, bracelets, wristwatches, tape recorders, soft drink cans, coins, calculations, lipstick holders, campaign buttons, cellular telephones, key rings and keys. The invention is also capable of detecting the weaponry under various clothing or inside the following (including but not limited to): purses, belts (front, side back), shoulder holsters, ankle holster under slacks, briefcase, coats (including leather, overcoats, wind breakers, and polo shirts). The following examples are tests of the present invention.

Figure 16:
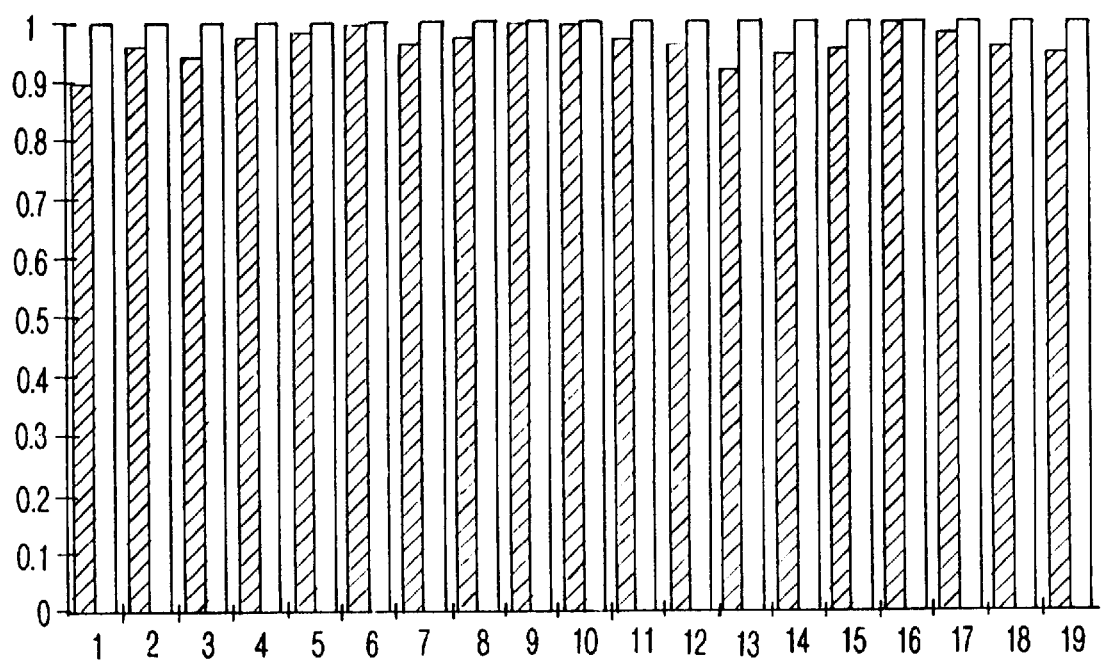
FIG. 16 is a plot of a test of the artificial neural network of the invention.

FIG. 16 is a plot of an artificial neural net test, and FIG. 17 shows the raw data for the test. It shows five weapons being tested (0.9 mm automatic, 0.380 automatic, 0.38 revolver, a 0.357 revolver and a 0.22 caliber starter pistol) from data taken from a system according to the present invention. Each of the 19 plots was averaged over 50 points over 250 MHz of bandwidth at 2.2 Ghz. On the left of the plot are numbers ranging from 0 to 1. When a weapon is present, 1 is the target number. When a weapon is not present, 0 is the target number. For actual operation, a result of greater than 0.8 would cause the weapons detector to turn on a red light to indicate a weapon is present. A result of less than 0.2 would cause the weapons detector to turn on a green light indicating no weapon is present. Any result between 0.2 and 0.8 would cause the yellow light to the illuminated, indicating that a second test should be taken as the suspect is turning (allowing better resolution on a potential weapon). The white bar represents the target output. The black bar represents the actual output. The first three tests involved a 0.9 mm handgun. The first test was for a 0.9 mm under a man's arm. The second test was a 0.9 mm placed barrel down in a holster along the man's side. The suspect had his hands up. The third test was a man with a 0.9 mm placed in a belt in the man's back. The fourth test was a 0.380 caliber automatic in the man's front belt. The fifth test was a 0.380 automatic handgun on the side with the suspect's arms up. The sixth test was a 0.380 in the belt at the man's back. The seventh test was a 0.38 caliber revolver located in the belt at the suspect's side with his arms down. The eight test was a 0.38 caliber revolved placed in the belt at the man's back. The ninth test was a 0.9 mm automatic placed in a suspect's front belt in a cluttered environment (a large western-style beltbuckle, a large key ring in the suspect's pocket, a calculator on the suspect's belt, a calculator in the front shirt pocket, and a large number of coins in the suspect's pocket). The tenth test was a 0.9 mm automatic on the man's left side with his arms down in a similar cluttered environment. The eleventh test was a 0.9 mm automatic located in the back belt on a cluttered man. The twelfth test was a 0.357 caliber handgun located in a holster on the suspect's side with his arms up and with the same type of clutter environment. The thirteenth test was a 0.357 caliber handgun in the man's belt at the back with the same type of clutter environment. The fourteenth test was a 0.38 caliber handgun in a holster on the side in the same type of clutter environment. The fifteenth test was a 0.38 caliber revolver under a man's arm with the same type of clutter environment. The sixteenth test was a 0.38 caliber revolver stuck in a belt on a man's side in a cluttered environment. The seventeenth test was a 0.38 caliber revolved located in the belt on the suspect's back in a cluttered environment. The eighteenth test was a 0.22 caliber starter pistol (sp in the log) located in the front belt of the suspect in a cluttered environment. The nineteenth test was a starter pistol in the back belt in a cluttered environment. In all cases, the trained neural net was able to successfully detect the presence of the handgun.

Figure 18:
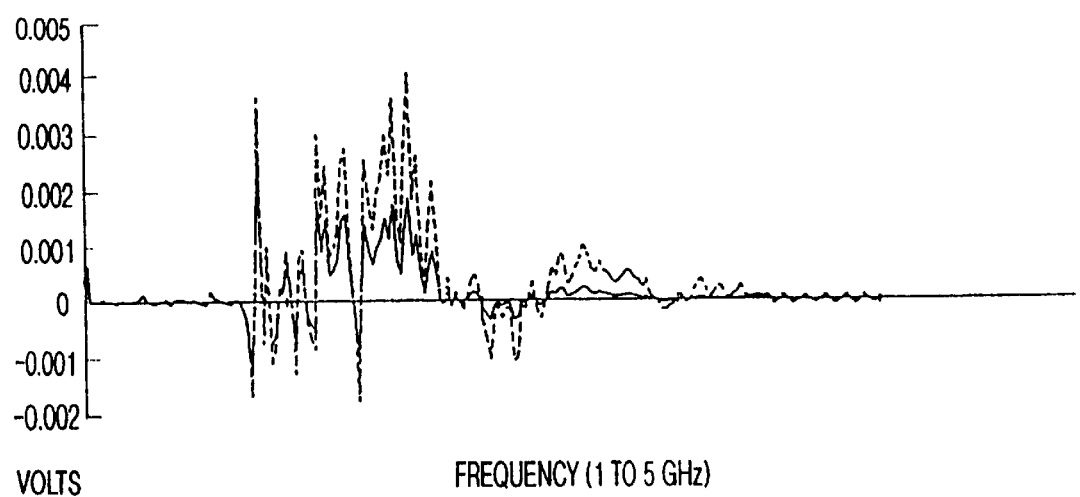
FIG. 18 is a plot showing the spectral difference and normalized difference (frontside) between a man with a weapon under the arm and a man without a weapon.

FIG. 18 shows the spectral difference and the normalized difference between a man with a weapon under his arm and the same man without a weapon. The solid lines represent the difference in waveform when a weapon is present and the dotted line shows the normalized difference when a weapon is present. Of significance is the higher resolution in the 2 to 3 GHz range. This represents the standard phenomena we discovered from the ringing of the return from the weapon at approximately 3 GHz. This is repeated consistently no matter what weapon is tested. Note also the 0.002 volt difference in waveforms at 2 GHz. This is the frontside of the weapon, which in this case was a 0.9 mm automatic.

Figure 19:
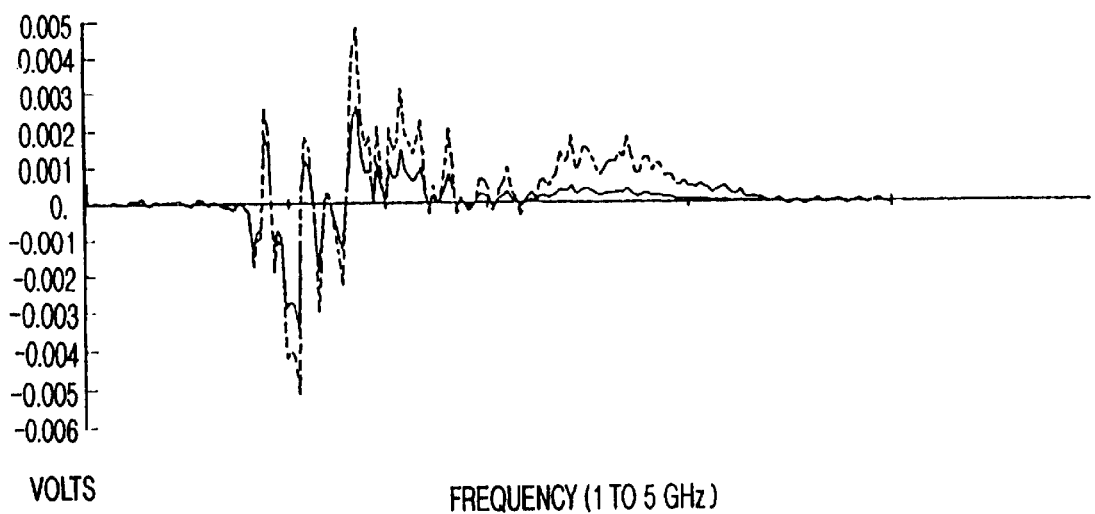
FIG. 19 is a plot showing the spectral difference and normalized difference (backside) between a man with a weapon under the arm and a man without a weapon.
Figure 20:
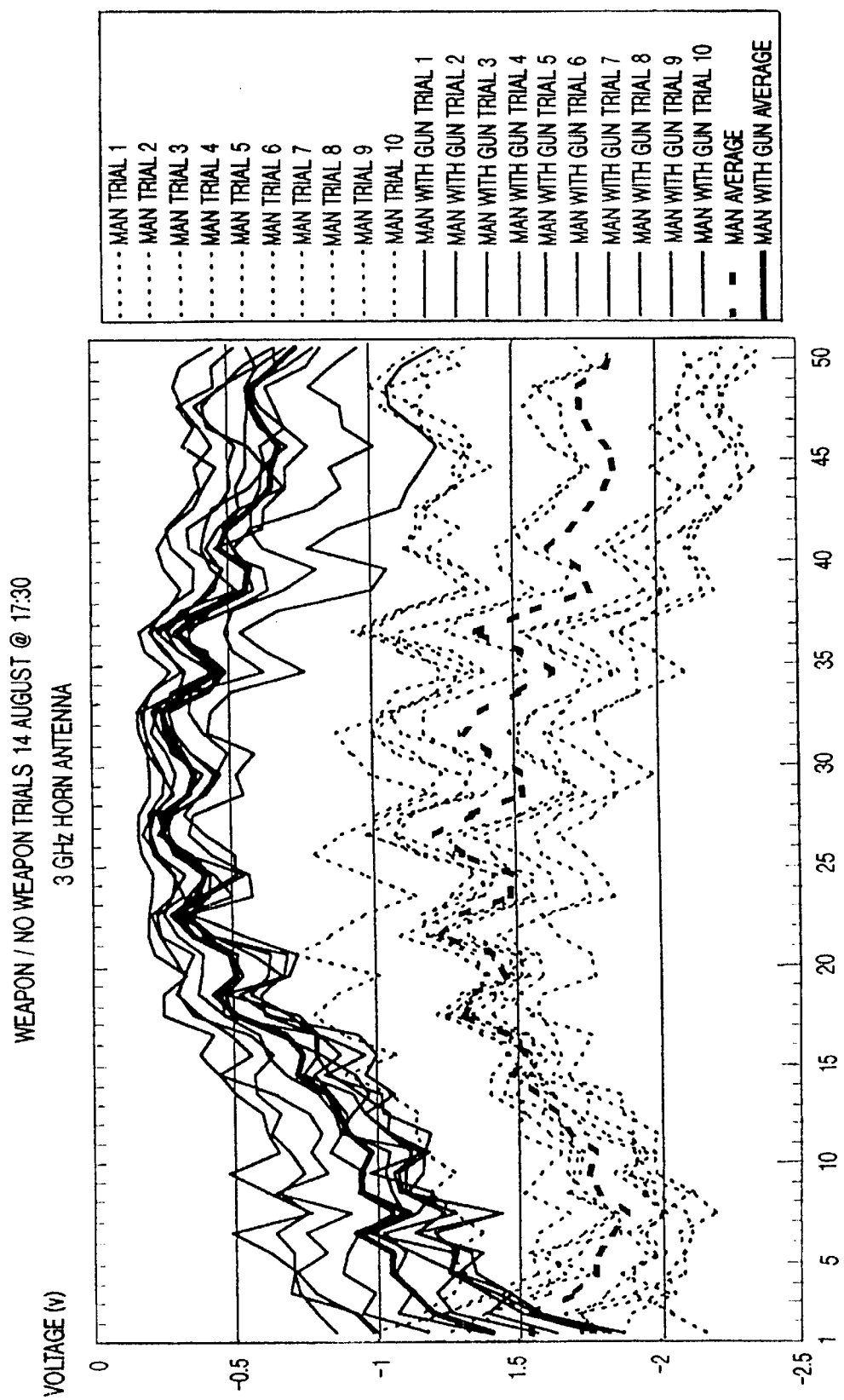
FIG. 20 is a plot of test results employing a 3 GHz horn antenna.

FIG. 19 again this shows the spectral difference and the normalized difference between a man with a weapon and a man without a weapon with the gun located in the belt on the back of the man. The solid lines represent the difference when a weapon is present and the dotted line shows the normalized difference when a weapon is present. At 1.5 GHz the difference is approximately 0.0025 volts and at 3 GHz it is about 0.0015 volts. The waveform here shows the same phenomena of an increased resolution at both 1.5 GHz and at 3 GHz. These differences are easily discernible with a neural net pattern recognition program.

The tests of FIG. 21 used a 0.38 caliber revolver located on the side of a man. The dotted lines show the return from a man without a weapon. The heavy dotted line is the average of 50 calculations of a man without a weapon. The solid lines are the waveforms from a man with a weapon. The heaviest solid line (located right in the middle of all the solid lines) is the average of all the calculations of a man with a weapon. The difference in the waveforms is an average of more than 1.475 v.

FIG. 21 shows the averages of 50 calculations with a man (dotted line) and a man with a gun (solid line). The gun was a 0.9 mm automatic. Again the difference is significant (about 0.5 to 1.0 v for the majority of the calculations).

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An object detector comprising:

an electrical circuit for producing electromagnetic radiation;

at least one antenna to transmit the produced radiation toward an object of interest and to collect radiation that is reflected from the object;

an electrical circuit to process the collected reflected radiation and convert the collected radiation to at least one waveform;

a system to automatically compare waveform phase and amplitude information from the at least one waveform to pre-determined information; and an automatic affirmative signal if an approximate match is made between the information from the at least one waveform and the pre-determined information;

wherein no image of the object of interest is displayed.

2. The detector of claim 1 further comprising a range finder for determining an approximate distance between the detector and the object of interest.

3. The detector of claim 2 wherein said range finder is in communication with said electrical circuit for producing electromagnetic radiation such that the distance between the detector and the object of interest influences the gain of said electrical circuit.

4. The detector of claim 1 wherein said electrical circuit for producing electromagnetic radiation produces electromagnetic radiation with frequencies in the microwave region.

5. The detector of claim 4 wherein said electrical circuit for producing electromagnetic radiation produces electromagnetic radiation with frequencies between approximately 1 GHz and approximately 10 GHz.

6. The detector of claim 4 wherein said electrical circuit for producing electromagnetic radiation produces a pulse of broad band frequencies in the microwave region.

7. The detector of claim 4 wherein said electrical circuit for producing electromagnetic radiation scans across a frequency range in the microwave region.

8. The detector of claim 6 wherein said electrical circuit for producing electromagnetic radiation produces an approximate 10 nanosecond pulse of broad band frequencies.

9. The detector of claim 1 wherein said electrical circuit to process the collected reflected radiation and convert further comprises an automatic gain control.

10. The detector of claim 1 wherein said electrical circuit to process the collected reflected radiation and convert converts the collected radiation to at least one waveform comprising a Fourier transform.

11. The detector of claim 1 wherein said affirmative signal comprises an LED.

12. The detector of claim 1 wherein the detector is a self-contained, hand-held detector.

13. The detector of claim 1 wherein the detector can detect an object of interest at ranges of up to approximately 20 yards.

14. The detector of claim 1 wherein said system to compare the information processes the reflected radiation and generates a signal if an approximate match is made within approximately one second of transmitting the electromagnetic radiation toward the object of interest.

15. The detector of claim 1 wherein said affirmative signal comprises at least one signal selected from the group consisting of audible signals, silent signals, tactile signals, visual signals, mechanical signals, and displayed messages.

16. The detector of claim 1 further comprising a barrier device to preclude the entry of an individual into a specified area upon detecting an object of interest on the individual.

17. The detector of claim 1 further comprising a camera system upon detection of an object of interest.

18. The detector of claim 1 wherein the detector detects at least one object selected from the group consisting of handguns, rifles, shotguns, knives, and pipe bombs.

19. The detector of claim 1 wherein the detector distinguishes at least one object of potential threat from non-threatening objects selected from the group consisting of belt buckles, bracelets, wristwatches, tape recorders, soft drink cans, coins, calculators, lipstick holders, calculators, campaign buttons, cellular telephones, key rings, and keys.

20. The detector of claim 1 wherein the detector detects objects of potential threat in or under clothing/accessories selected from the group consisting of purses, belts, holsters, pants, briefcases, coats and shirts.

21. The detector of claim 1 wherein said system to compare information comprises a computer.

22. The detector of claim 1 wherein said at least one antenna to transmit radiation and collect radiation comprises a single antenna.

23. The detector of claim 1 additionally comprising an automatic negative signal if an approximate match is not made between the information from the at least one waveform and the pre-determined information.

24. The detector of claim 1 additionally comprising an automatic equivocal signal if a predetermined level of uncertainty exists as to whether an approximate match is made between the information from the at least one waveform and the pre-determined information.

25. A method of detecting an object of interest, the method comprising the steps of:
  a) transmitting electromagnetic radiation toward an object of interest;
  b) collecting electromagnetic radiation that is reflected from the object of interest;
  c) converting the collected electromagnetic radiation into at least one waveform;
  d) automatically comparing waveform phase and amplitude information from the at least one waveform to pre-determined information; and
  e) automatically generating an affirmative signal if an approximate match is made between the information from the at least one waveform and the pre-determined information;
wherein no image of the object of interest is displayed.

26. The method of claim 25 additionally comprising the step of determining the approximate distance between the detector and the object of interest.

27. The method of claim 26 wherein the step of transmitting comprises setting transmitter gain according to the approximated distance between the detector and the object of interest.

28. The method of claim 25 wherein the step of transmitting comprises transmitting electromagnetic radiation with frequencies in the microwave region.

29. The method of claim 28 wherein the step of transmitting comprises transmitting electromagnetic radiation with frequencies between approximately 1 GHz and approximately 10 GHz.

30. The method of claim 28 wherein the step of transmitting comprises transmitting a pulse of broad band frequencies in the microwave region.

31. The method of claim 28 wherein the step of transmitting comprises scanning across a frequency range in the microwave region.

32. The method of claim 30 wherein the step of transmitting comprises transmitting an approximate 10 nanosecond pulse of broad band frequencies.

33. The method of claim 25 wherein the step of converting the collected electromagnetic radiation comprises converting with a receiver circuit with automatic gain control.

34. The method of claim 25 wherein the step of converting the collected electromagnetic radiation comprises converting to at least one waveform comprising a Fourier transform.

35. The method of claim 25 wherein the step of generating an affirmative signal if an approximate match is made comprises generating a signal with an LED.

36. The method of claim 25 wherein the steps of transmitting, collecting, converting, comparing, and generating all take place in a self-contained, hand-held detector.

37. The method of claim 25 wherein the step of transmitting and collecting radiation comprises transmitting radiation to and collecting radiation reflected from an object of interest at a distance of up to approximately 20 yards.

38. The method of claim 25 wherein the steps of collecting, converting, comparing, and generating are all performed within approximately one second of transmitting the electromagnetic radiation toward the object of interest.

39. The method of claim 25 wherein the step of generating an affirmative signal comprises generating at least one signal selected from the group consisting of audible signals, silent signals, tactile signals, visual signals, mechanical signals, and displayed messages.

40. The method of claim 25 wherein the step of generating a signal comprises providing a barrier device to preclude the entry of an individual into a specified area upon detecting an object of interest on the individual.

41. The method of claim 25 wherein the step of generating a signal comprises activating a camera system upon detection of an object of interest.

42. The method of claim 25 wherein the step of generating comprises generating a signal when objects selected from the group consisting of handguns, rifles, shotguns, knives, and pipe bombs are detected.

43. The method of claim 25 wherein the step of comparing distinguishes objects of potential threat from objects selected from the group consisting of belt buckles, bracelets, wristwatches, tape recorders, soft drink cans, coins, calculators, lipstick holders, calculators, campaign buttons, cellular telephones, key rings, and keys.

44. The method of claim 25 wherein the step of collecting comprises collecting reflected radiation from objects of potential threat in or under clothing/accessories selected from the group consisting of purses, belts, holsters, pants, briefcases, coats and shirts.

45. The detector of claim 1 wherein said electrical circuit to process the collected reflected radiation and convert to at least one waveform, converts to at least one waveform according to phase characteristics of the collected radiation.

46. The detector of claim 45 wherein said system to compare the waveforms selects those of the at least one waveforms with a characteristic phase and then compares the amplitudes of the selected waveforms to each other as well as to a pre-determined value.

47. The method of claim 25 wherein the step of converting the collected electromagnetic radiation into at least one waveform comprises converting the radiation into at least one waveform according to phase characteristics of the collected radiation.

48. The method of claim 47 wherein the step of comparing comprises selecting those waveforms with a characteristic phase from the at least one waveforms and then comparing the amplitudes of the selected waveforms to each other as well as to a pre-determined value.

49. The method of claim 25 additionally comprising the step of automatically generating a negative signal if an approximate match is not made between the information from the at least one waveform and the pre-determined information.

50. The method of claim 25 additionally comprising the step of automatically generating an equivocal signal if a predetermined level of uncertainty exists as to whether an approximate match is made between the information from the at least one waveform and the pre-determined information.

* * * * *